(12) United States Patent
Ye et al.

(10) Patent No.: US 8,428,133 B2
(45) Date of Patent: Apr. 23, 2013

(54) ADAPTIVE CODING OF VIDEO BLOCK PREDICTION MODE

(75) Inventors: Yan Ye, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1118 days.

(21) Appl. No.: 12/133,227

(22) Filed: Jun. 4, 2008

(65) Prior Publication Data

US 2008/0310507 A1    Dec. 18, 2008

Related U.S. Application Data

(60) Provisional application No. 60/944,470, filed on Jun. 15, 2007, provisional application No. 60/979,762, filed on Oct. 12, 2007.

(51) Int. Cl.
*H04N 7/12* (2006.01)
*H04N 11/02* (2006.01)
*H04N 11/04* (2006.01)

(52) U.S. Cl.
USPC ................................ 375/240.14; 375/240.15

(58) Field of Classification Search .................. None
See application file for complete search history.

(56) References Cited

U.S. PATENT DOCUMENTS

| | | | |
|---|---|---|---|
| 4,894,713 A | 1/1990 | Delogne et al. | |
| 5,629,779 A | 5/1997 | Jeon | |
| 5,684,536 A | 11/1997 | Sugiyama et al. | |
| 6,115,071 A | 9/2000 | Hurst, Jr. et al. | |
| 6,157,676 A | 12/2000 | Takaoka et al. | |
| 6,345,121 B1 | 2/2002 | Matsumoto | |
| 6,674,910 B1 | 1/2004 | Moon et al. | |
| 6,724,818 B1 | 4/2004 | Frojdh et al. | |
| 7,170,937 B2 | 1/2007 | Zhou | |

(Continued)

FOREIGN PATENT DOCUMENTS

| CN | 1289213 A | 3/2001 |
|---|---|---|
| CN | 1798341 A | 7/2006 |

(Continued)

OTHER PUBLICATIONS

"Directional Discrete Cosine Transforms for Image Coding", Zeng et al., 2006 IEEE International Conference Multimedia and Expo, Jul. 2006, p. 721-724.*

(Continued)

*Primary Examiner* — Gregory Sefcheck
(74) *Attorney, Agent, or Firm* — John G. Rickenbrode

(57) ABSTRACT

This disclosure describes techniques for coding of header information of video blocks. In particular, the techniques of this disclosure select one of a plurality of prediction modes for use in generating a prediction block of a video block of a coding unit, the plurality of prediction modes including uni-directional prediction modes and multi-directional prediction modes that combine at least two unidirectional prediction modes. An encoding device encodes the prediction mode of the current video block based on prediction modes of one or more previously encoded video blocks of the coding unit. Likewise, a decoding unit receives encoded video data of a video block of a coding unit and decodes the encoded video data to identify one of a plurality of prediction modes for use in generating a prediction block of the video block based on prediction modes of one or more previously decoded video blocks of the coding unit.

69 Claims, 8 Drawing Sheets

U.S. PATENT DOCUMENTS

| | | | |
|---|---|---|---|
| 7,215,707 B2 | 5/2007 | Lee et al. | |
| 7,263,232 B2 | 8/2007 | Srinivasan | |
| 7,379,501 B2 | 5/2008 | Lainema | |
| 7,529,484 B2 | 5/2009 | Xu et al. | |
| 7,706,443 B2 | 4/2010 | Chandramouly et al. | |
| 7,751,476 B2 | 7/2010 | Tanizawa et al. | |
| 7,933,337 B2 | 4/2011 | Srinivasan et al. | |
| 7,970,058 B2 * | 6/2011 | Suzuki | 375/240.16 |
| 2002/0055215 A1 | 5/2002 | Tamura et al. | |
| 2003/0146936 A1 | 8/2003 | Greer et al. | |
| 2003/0206594 A1* | 11/2003 | Zhou | 375/240.16 |
| 2004/0120590 A1 | 6/2004 | Fuchs et al. | |
| 2004/0151395 A1 | 8/2004 | Kesaniemi et al. | |
| 2004/0213348 A1 | 10/2004 | Kim et al. | |
| 2005/0025236 A1 | 2/2005 | Yan et al. | |
| 2005/0036549 A1 | 2/2005 | He et al. | |
| 2005/0078754 A1 | 4/2005 | Liang et al. | |
| 2005/0152452 A1* | 7/2005 | Suzuki | 375/240.16 |
| 2005/0157797 A1 | 7/2005 | Gaedke | |
| 2005/0243920 A1* | 11/2005 | Murakami et al. | 375/240.12 |
| 2005/0281334 A1* | 12/2005 | Walker et al. | 375/240.16 |
| 2005/0281337 A1 | 12/2005 | Kobayashi et al. | |
| 2006/0146936 A1 | 7/2006 | Srinivasan | |
| 2007/0005795 A1 | 1/2007 | Gonzalez | |
| 2007/0014348 A1 | 1/2007 | Bao et al. | |
| 2007/0160303 A1 | 7/2007 | Guleryuz et al. | |
| 2008/0008246 A1 | 1/2008 | Mukherjee et al. | |
| 2008/0075171 A1* | 3/2008 | Suzuki | 375/240.16 |
| 2008/0310504 A1* | 12/2008 | Ye et al. | 375/240.02 |
| 2008/0310512 A1* | 12/2008 | Ye et al. | 375/240.16 |
| 2008/0310745 A1* | 12/2008 | Ye et al. | 382/238 |
| 2012/0027079 A1 | 2/2012 | Ye et al. | |
| 2012/0099646 A1 | 4/2012 | Coban et al. | |

FOREIGN PATENT DOCUMENTS

| | | |
|---|---|---|
| CN | 1801940 A | 7/2006 |
| EP | 1553782 A2 | 7/2005 |
| EP | 1679903 A2 | 7/2006 |
| EP | 1768415 A1 | 3/2007 |
| EP | 1876838 A2 | 1/2008 |
| JP | 1155678 A | 6/1989 |
| JP | 08280032 | 10/1996 |
| JP | 10271505 A | 10/1998 |
| JP | 2002135126 A | 5/2002 |
| JP | 2002232887 A | 8/2002 |
| JP | 2003250157 A | 9/2003 |
| JP | 2004007766 A | 1/2004 |
| JP | 2006191628 A | 7/2006 |
| JP | 2007053561 A | 3/2007 |
| KR | 20060079087 A | 7/2006 |
| RU | 2119727 | 9/1998 |
| RU | 2127962 C1 | 3/1999 |
| RU | 2162280 C2 | 1/2001 |
| RU | 2004139081 | 7/2005 |
| RU | 2258320 C2 | 8/2005 |
| RU | 2004125588 | 1/2006 |
| RU | 2005113308 | 1/2006 |
| RU | 2005137246 | 6/2007 |
| RU | 2314656 | 1/2008 |
| WO | WO9421083 A1 | 9/1994 |
| WO | WO9800807 A1 | 1/1998 |
| WO | WO03063501 A1 | 7/2003 |
| WO | WO2004032032 A1 | 4/2004 |
| WO | WO2007010690 A1 | 1/2007 |
| WO | WO2007046644 | 4/2007 |
| WO | WO2007063472 A2 | 6/2007 |

OTHER PUBLICATIONS

Sridhar Srinivasan, "An introduction to HD Photo," MPEG document No. wg1n4184. Apr. 2007.

T. Shiodera, A. Tanizawa, and T. Chujoh, "Simulation Results of Bidirectional Intra Prediction on KTA software version 1.3," ITU-T Q.6/SG16 VCEG, VCEG-AF06, San Jose, USA, Apr. 2007.

T. Shiodera, A. Tanizawa, and T. Chujoh, "Bidirectional Intra Prediction," ITU-T Q.6/SG16 VCEG, VCEG-AE14, Marrakech, Morocco, Jan. 2007.

AASE S.O et al: "A critique of SVD-based image coding systems" IEEE Circuits and Systems, Orlando, FL, vol. 4, May 30, 1999-Jun. 2, 1999, pp. 13-16, XP002503942.

Bing Zeng et al: "Directional Discrete Cosine Transforms for Image Coding" Multimedia and Expo, 2006 IEEE International Conference on, IEEE, Jul. 1, 2006, pp. 721-724, XP031 032937 ISBN: 97S-1-4244-0366-0.

International Search Report—PCT/US2008/066797, International Search Authority—European Patent Office—Jan. 27, 2009.

Marta Karczewicz: "Improved Intra Coding" Video Standards and Drafts, No. VCEG-AF15, Apr. 19, 2007, pp. 1-4, XP030003536.

Richardson I E G: "H264/MPEG-4 Part 10 White Paper—Prediction of Intra Macroblocks" Internet Citation, [Online] XP02281494, Retrieved from the Internet: URL: http://www.vcodex.com/h264.html.h264_intrapred.pdf [retrieved on May 24, 2004].

V.I. Pershikov, V.M. Savinkov, "Tolkovy Slovar po Informatike" (The Explanatory Dictionary of Informatics), Moscow, Finances and Statistics Publishing House, 1995, p. 425.

Written Opinion—PCT/US08/066797, International Search Authority—European Patent Office—Jan. 27, 2009.

Xiaopeng, et al., "A novel coefficient scanning scheme for directional spatial prediction-based image compression", Multimedia and Expo, 2003. Proceedings. 2003 International Conference on Jul. 6-9, 2003, Piscataway, NJ, vol. 2, pp. 557-560, XP010650616.

Ye, et al., "Improved Intra Coding," ITU-T Q.6/SG16 VCEG, C257, Geneva, Switzerland, Jun. 2007.

Iain Richardson: Video Coding H.264 i MPEG-4—New Generation Standards, Moscow, Tekhnosfera, 2005, translation of 2003 publication, pp. 145-183, 233-240.

Jongho Kim et al., "Complexity Reduction Algorithm for Intra Mode Selection in H.264/AVC Video Coding", Advanced Concepts for Intelligent Vision Systems, Lecture Notes in Computer Science, Springer Berlin/Heidelberg, vol. 4179/2006, Oct. 4, 2006, pp. 454-465.

Ragip Kurceren, et al., "Improvements on CABAC," ITU—Telecommunications Standardization Sector Study Group 16 Question 6 Video Coding Experts Group (VCEG), VCEG-024, 15th Meeting: Pattaya, Thailand, Dec. 4-6, 2001.

Wiegand, "Text of Committee Draft of Joint Video Specification", Joint Video Team (JVT) of ISO/IEC MPEG and ITU-T VCEG, JVT-C167, 3rd Meeting: Fairfax, Virginia, USA, May 6-10, 2002.

Yan Ye and Marta Karczewicz, "Complexity Analysis of Improved Intra Coding", ITU—Telecommunications Standardization Sector Study Group 16 Question 6 Video Coding Experts Group (VCEG), 34th Meeting: Antalya Turkey, Jan. 2008, VCEG-AH20, pp. 1-6.

Taiwan Search Report—TW097122363—TIPO—Feb. 14, 2012.

* cited by examiner

COEFF POSITIONS (71)

| c1 | c2 | c3 | c4 |
|---|---|---|---|
| c5 | c6 | c7 | c8 |
| c9 | c10 | c11 | c12 |
| c13 | c14 | c15 | c16 |

BLOCK 1 (72)

| 9 | 4 | 0 | 0 |
|---|---|---|---|
| 6 | 1 | 0 | 0 |
| 1 | 0 | 0 | 0 |
| 2 | 0 | 0 | 0 |

STATISTICS 1 (76)

| 1 | 1 | 0 | 0 |
|---|---|---|---|
| 1 | 1 | 0 | 0 |
| 1 | 0 | 0 | 0 |
| 1 | 0 | 0 | 0 |

BLOCK 2 (73)

| 10 | 5 | 0 | 0 |
|---|---|---|---|
| 2 | 0 | 0 | 0 |
| 1 | 0 | 0 | 0 |
| 1 | 0 | 0 | 0 |

STATISTICS 2 (77)

| 2 | 2 | 0 | 0 |
|---|---|---|---|
| 2 | 1 | 0 | 0 |
| 2 | 0 | 0 | 0 |
| 2 | 0 | 0 | 0 |

BLOCK 3 (74)

| 10 | 2 | 0 | 0 |
|---|---|---|---|
| 1 | 0 | 0 | 0 |
| 1 | 0 | 0 | 0 |
| 0 | 0 | 0 | 0 |

STATISTICS 3 (78)

| 3 | 3 | 0 | 0 |
|---|---|---|---|
| 3 | 1 | 0 | 0 |
| 3 | 0 | 0 | 0 |
| 2 | 0 | 0 | 0 |

BLOCK 4 (75)

| 8 | 0 | 0 | 0 |
|---|---|---|---|
| 1 | 0 | 0 | 0 |
| 1 | 0 | 0 | 0 |
| 0 | 0 | 0 | 0 |

STATISTICS 4 (79)

| 4 | 3 | 0 | 0 |
|---|---|---|---|
| 4 | 1 | 0 | 0 |
| 4 | 0 | 0 | 0 |
| 2 | 0 | 0 | 0 |

FIG. 4

ADAPTIVE CODING OF VIDEO BLOCK PREDICTION MODE

This application claims the benefit of U.S. Provisional Application No. 60/944,470, filed Jun. 15, 2007 and U.S. Provisional Application No. 60/979,762, filed Oct. 12, 2007, the entire content of each of which is incorporated herein by reference.

TECHNICAL FIELD

This disclosure relates to digital video coding and, more particularly, entropy coding of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression generally includes spatial prediction and/or temporal prediction. In particular, intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of matching video blocks of two or more adjacent coded units.

After spatial or temporal prediction, a residual block is generated by subtracting a prediction video block generated during the prediction process from the original video block that is being coded. The residual block is thus indicative of the differences between the predictive block and the current block being coded. The video encoder may apply transform, quantization and entropy coding processes to further reduce the bit rate associated with communication of the residual block. The transform techniques may change a set of pixel values into transform coefficients, which represent the energy of the pixel values in the frequency domain. Quantization is applied to the transform coefficients, and generally involves a process that limits the number of bits associated with any given coefficient. Prior to entropy encoding, the video encoder scans the quantized coefficient block into a one-dimensional vector of coefficients. The video encoder entropy encodes the vector of quantized transform coefficients to further compress the residual data.

A video decoder may perform inverse entropy coding operations to retrieve the coefficients. Inverse scanning may also be performed at the decoder to form two-dimensional blocks from received one-dimensional vectors of coefficients. The video decoder then inverse quantizes and inverse transforms the coefficients to obtain the reconstructed residual block. The video decoder then decodes a prediction video block based on prediction information and the motion information. The video decoder then adds the prediction video block to the corresponding residual block in order to generate the reconstructed video block and to generate a decoded sequence of video information.

SUMMARY

This disclosure describes techniques for coding of header information of video blocks. In particular, the techniques of this disclosure select one of a plurality of prediction modes for use in generating a prediction block of a video block of a coding unit, the plurality of prediction modes including unidirectional prediction modes and multi-directional prediction modes that combine at least two unidirectional prediction modes. A video encoder may be configured to encode the prediction mode of the current video block based on prediction modes of one or more previously encoded video blocks of the coding unit. A video decoder may also be configured to perform the reciprocal decoding function of the encoding performed by the video encoder. Thus, the video decoder uses similar techniques to decode the prediction mode for use in generating a prediction block for the video block.

The video encoder may, in some instances, select different coding contexts for use in coding the selected prediction mode based on the types, e.g., unidirectional or multi-directional, of prediction modes of the previously encoded video blocks. Moreover, the techniques of this disclosure may further selectively apply transforms to residual information of the video block based on the selected prediction mode. In one example, the video encoder may store a plurality of directional transforms that each corresponds with a different one of the prediction modes, and apply the corresponding directional transform to the video block based on the selected prediction mode of the video block. In other instances, the video encoder may store at least one discrete cosine transform (DCT) or integer transform as well as a plurality of directional transforms and apply the DCT or integer transform to the residual data of the video block when the selected prediction mode exhibits limited directionality and apply one of the directional transforms to the residual data of the video block when the selected prediction mode exhibits directionality.

In one aspect, a method of encoding video data comprises selecting one of a plurality of prediction modes for use in generating a prediction block of a video block of a coding unit and encoding the prediction mode of the current video block based on prediction modes of one or more previously encoded video blocks of the coding unit. The prediction modes include unidirectional prediction modes and multi-directional prediction modes that combine at least two unidirectional prediction modes.

In another aspect, a device that encodes video data comprises a prediction unit that selects one of a plurality of prediction modes for use in generating a prediction block of a video block of a coding unit and an entropy encoding unit that encodes the prediction mode of the current video block based on prediction modes of one or more previously encoded video blocks of the coding unit. The prediction modes include unidirectional prediction modes and multi-directional prediction modes that combine at least two unidirectional prediction modes.

In another aspect, a computer-readable medium comprises instructions that upon execution in a video coding device cause the device to code video data, wherein the instructions cause the device to select one of a plurality of prediction modes for use in generating a prediction block of a video block of a coding unit and encode the prediction mode of the current video block based on prediction modes of one or more previously encoded video blocks of the coding unit. The prediction modes include unidirectional prediction modes and multi-directional prediction modes that combine at least two unidirectional prediction modes.

In another aspect, a device that encodes video data comprises means for selecting one of a plurality of prediction modes for use in generating a prediction block of a video block of a coding unit and means for encoding the prediction mode of the current video block based on prediction modes of one or more previously encoded video blocks of the coding unit. The prediction modes include unidirectional prediction modes and multi-directional prediction modes that combine at least two unidirectional prediction modes.

In another aspect, a method of decoding video data comprises receiving encoded video data of a video block of a coding unit and decoding the encoded video data to identify one of a plurality of prediction modes for use in generating a prediction block of the video block based on prediction modes of one or more previously decoded video blocks of the coding unit. The prediction modes include unidirectional prediction modes and multi-directional prediction modes that combine at least two unidirectional prediction modes.

In another aspect, a device for decoding video data comprises an entropy decoding unit that decodes encoded video data of a video block of a coding unit to identify one of a plurality of prediction modes for use in generating a prediction block of the video block based on prediction modes of one or more previously decoded video blocks of the coding unit. The prediction modes include unidirectional prediction modes and multi-directional prediction modes that combine at least two unidirectional prediction modes. The device also includes a prediction unit that generates the prediction block using the decoded prediction mode.

In another aspect, a computer-readable medium comprises instructions that upon execution in a video coding device cause the device to code video blocks. The instructions cause the device to receive encoded video data of a video block of a coding unit and decode the encoded video data to identify one of a plurality of prediction modes for use in generating a prediction block of the video block based on prediction modes of one or more previously decoded video blocks of the coding unit. The prediction modes include unidirectional prediction modes and multi-directional prediction modes that combine at least two unidirectional prediction modes.

In another aspect, a device for decoding video data comprises means for receiving encoded video data of a video block of a coding unit and means for decoding the encoded video data to identify one of a plurality of prediction modes for use in generating a prediction block of the video block based on prediction modes of one or more previously decoded video blocks of the coding unit. The prediction modes include unidirectional prediction modes and multi-directional prediction modes that combine at least two unidirectional prediction modes.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 4 is a conceptual diagram illustrating a hypothetical example of adjusting the scan order of coefficients consistent with this disclosure.

DETAILED DESCRIPTION

Figure 1:
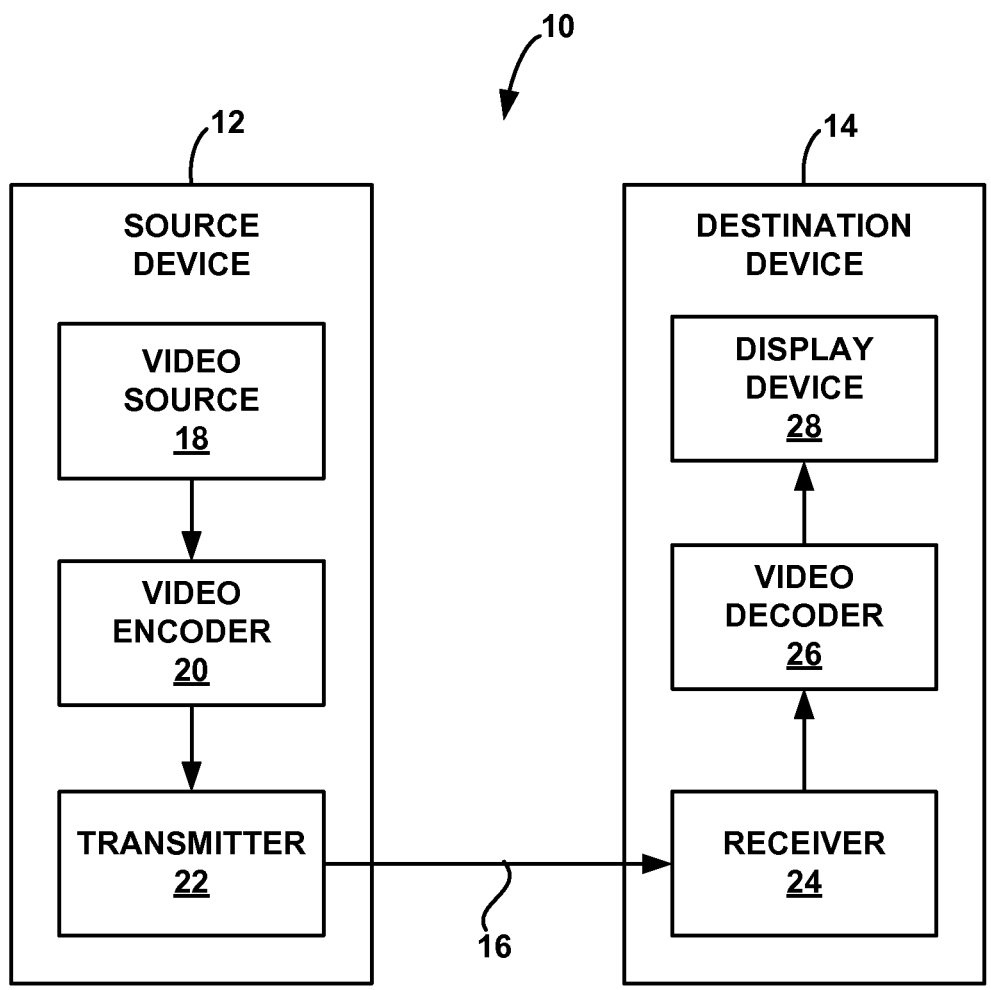
FIG. 1 is a block diagram illustrating a video encoding and decoding system that performs the coding techniques described in this disclosure.

FIG. 1 is a block diagram illustrating a video encoding and decoding system 10 that performs coding techniques as described in this disclosure. As shown in FIG. 1, system 10 includes a source device 12 that transmits encoded video data to a destination device 14 via a communication channel 16. Source device 12 generates coded video data for transmission to destination device 14. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, source device 12 may be a so-called camera phone or video phone, in which case video source 18 may be a video camera. In each case, the captured, pre-captured, or computer-generated video may be encoded by video encoder 20 for transmission from source device 12 to destination device 14 via transmitter 22 and communication channel 16.

Video encoder 20 receives video data from video source 18. The video data received from video source 18 may be a series of video frames. Video encoder 20 divides the series of frames into coding units and processes the coding units to encode the series of video frames. The coding units may, for example, be entire frames or portions of the frames (i.e., slices). Thus, in some instances, the frames may be divided into slices. Video encoder 20 divides each coding unit into blocks of pixels (referred to herein as video blocks or blocks) and operates on the video blocks within individual coding units in order to encode the video data. As such, a coding unit (e.g., a frame or slice) may contain multiple video blocks. In other words, a video sequence may include multiple frames, a frame may include multiple slices, and a slice may include multiple video blocks.

The video blocks may have fixed or varying sizes, and may differ in size according to a specified coding standard. As an example, the International Telecommunication Union Standardization Sector (ITU-T) H.264/MPEG-4, Part 10, Advanced Video Coding (AVC) (hereinafter "H.264/MPEG-4 Part 10 AVC" standard) supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In H.264, for example, each video block of 16 by 16 pixels, often referred to as a macroblock (MB), may be sub-divided into sub-blocks of smaller sizes and predicted in sub-blocks. In general, MBs and the various sub-blocks may be considered to be video blocks. Thus, MBs may be considered to be video blocks, and if partitioned or sub-partitioned, MBs can themselves be considered to define sets of video blocks.

For each of the video blocks, video encoder 20 selects a block type for the block. The block type may indicate whether the block is predicted using inter-prediction or intra-prediction as well as a partition size of the block. For example, H.264/MPEG-4 Part 10 AVC standard supports a number of inter- and intra-prediction block types including Inter 16×16, Inter 16×8, Inter 8×16, Inter 8×8, Inter 8×4, Inter 4×4, Intra 16×16, Intra 8×8, and Intra 4×4. As described in detail below, video encoder 20 may select one of the block types for each of the video blocks.

Video encoder 20 also selects a prediction mode for each of the video blocks. In the case of an intra-coded video block, the prediction mode may determine the manner in which to predict the current video block using one or more previously encoded video blocks. In the H.264/MPEG-4 Part 10 AVC standard, for example, video encoder 20 may select one of nine possible unidirectional prediction modes for each Intra 4×4 block; a vertical prediction mode, horizontal prediction mode, DC prediction mode, diagonal down/left prediction mode, diagonal down/right prediction mode, vertical-right prediction mode, horizontal-down predication mode, vertical-left prediction mode and horizontal-up prediction mode. Similar prediction modes are used to predict each Intra 8×8 block. For an Intra 16×16 block, video encoder 20 may select one of four possible unidirectional modes; a vertical prediction mode, a horizontal prediction mode, a DC prediction mode, and a plane prediction mode. In some instances, video encoder 20 may select the prediction mode from a set of prediction modes that includes not only unidirectional prediction modes, but also one or more multi-directional prediction modes that define combinations of the unidirectional modes. For example, the one or more multi-directional prediction modes may be bidirectional prediction modes that combine two unidirectional prediction modes as described in further detail below.

After selecting the prediction mode for the video block, video encoder 20 generates a predicted video block using the selected prediction mode. The predicted video block is subtracted from the original video block to form a residual block. The residual block includes a set of pixel difference values that quantify differences between pixel values of the original video block and pixel values of the generated prediction block. The residual block may be represented in a two-dimensional block format (e.g., a two-dimensional matrix or array of pixel difference values).

Following generation of the residual block, video encoder 20 may perform a number of other operations on the residual block before encoding the block. Video encoder 20 may apply a transform, such as an integer transform, a DCT transform, a directional transform, or a wavelet transform to the residual block of pixel values to produce a block of transform coefficients. Thus, video encoder 20 converts the residual pixel values to transform coefficients (also referred to as residual transform coefficients). The residual transform coefficients may be referred to as a transform block or coefficient block. The transform or coefficient block may be a one-dimensional representation of the coefficients when non-separable transforms are applied or a two-dimensional representation of the coefficients when separable transforms are applied. Non-separable transforms may include non-separable directional transforms. Separable transforms may include separable directional transforms, DCT transforms, integer transforms, and wavelet transforms.

Following transformation, video encoder 20 performs quantization to generate quantized transform coefficients (also referred to as quantized coefficients or quantized residual coefficients). Again, the quantized coefficients may be represented in one-dimensional vector format or two-dimensional block format. Quantization generally refers to a process in which coefficients are quantized to possibly reduce the amount of data used to represent the coefficients. The quantization process may reduce the bit depth associated with some or all of the coefficients. As used herein, the term "coefficients" may represent transform coefficients, quantized coefficients or other type of coefficients. The techniques of this disclosure may, in some instances, be applied to residual pixel values as well as transform coefficients and quantized transform coefficients. However, for purposes of illustration, the techniques of this disclosure will be described in the context of quantized transform coefficients.

When separable transforms are used and the coefficient blocks are represented in a two-dimensional block format, video encoder 20 scans the coefficients from the two-dimensional format to a one-dimensional format. In other words, video encoder 20 may scan the coefficients from the two-dimensional block to serialize the coefficients into a one-dimensional vector of coefficients. In accordance with one of the aspects of this disclosure, video encoder 20 may adjust the scan order used to convert the coefficient block to one dimension based on collected statistics. The statistics may comprise an indication of the likelihood that a given coefficient value in each position of the two-dimensional block is zero or non-zero and may, for example, comprise a count, a probability or other statistical metric associated with each of the coefficient positions of the two-dimensional block. In some instances, statistics may only be collected for a subset of the coefficient positions of the block. When the scan order is evaluated, e.g., after a particular number of blocks, the scan order may be changed such that coefficient positions within the block determined to have a higher probability of having non-zero coefficients are scanned prior to coefficient positions within the block determined to have a lower probability of having non-zero coefficients. In this way, an initial scanning order may be adapted to more efficiently group non-zero coefficients at the beginning of the one-dimensional coefficient vector and zero valued coefficients at the end of the one-dimensional coefficient vector. This may in turn reduce the number of bits spent on entropy coding since there are shorter runs of zeros between non-zeros coefficients at the beginning of the one-dimensional coefficient vector and one longer run of zeros at the end of the one-dimensional coefficient vector.

Following the scanning of the coefficients, video encoder 20 encodes each of the video blocks of the coding unit using any of a variety of entropy coding methodologies, such as context adaptive variable length coding (CAVLC), context adaptive binary arithmetic coding (CABAC), run length coding or the like. Source device 12 transmits the encoded video data to destination device 14 via transmitter 22 and channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to destination device 14.

Destination device 14 may include a receiver 24, video decoder 26, and display device 28. Receiver 24 receives the encoded video bitstream from source device 12 via channel 16. Video decoder 26 applies entropy decoding to decode the encoded video bitstream to obtain header information and quantized residual coefficients of the coded video blocks of the coded unit. As described above, the quantized residual coefficients encoded by source device 12 are encoded as a one-dimensional vector. Video decoder 26 therefore scans the quantized residual coefficients of the coded video blocks to convert the one-dimensional vector of coefficients into a two-dimensional block of quantized residual coefficients. Like video encoder 20, video decoder 26 may collect statistics that indicate the likelihood that a given coefficient position in the video block is zero or non-zero and thereby adjust the scan order in the same manner that was used in the encoding process. Accordingly, reciprocal adaptive scan orders can be applied by video decoder 26 in order to change the one-dimensional vector representation of the serialized quantized transform coefficients back to two-dimensional blocks of quantized transform coefficients.

Video decoder 26 reconstructs each of the blocks of the coding unit using the decoded header information and the decoded residual information. In particular, video decoder 26 may generate a prediction video block for the current video block and combine the prediction block with a corresponding residual video block to reconstruct each of the video blocks. Destination device 14 may display the reconstructed video blocks to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some cases, source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony. A device that includes video encoding and decoding components may also form part of a common encoding, archival and playback device such as a digital video recorder (DVR).

Video encoder 20 and video decoder 26 may operate according to any of a variety of video compression standards, such as such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and destination device 14 may operate on multimedia data. If applicable, the MUX-DEMUX units may conform to the ITU H.223 multiplexer protocol, or other protocols such as the user datagram protocol (UDP).

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast—terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple destination devices, each of which may be similar to destination device 14 of FIG. 1. Thus, although a single destination device 14 is shown in FIG. 1, for video broadcasting applications, source device 12 would typically broadcast the video content simultaneously to many destination devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of destination device 14 in FIG. 1.

Figure 2:
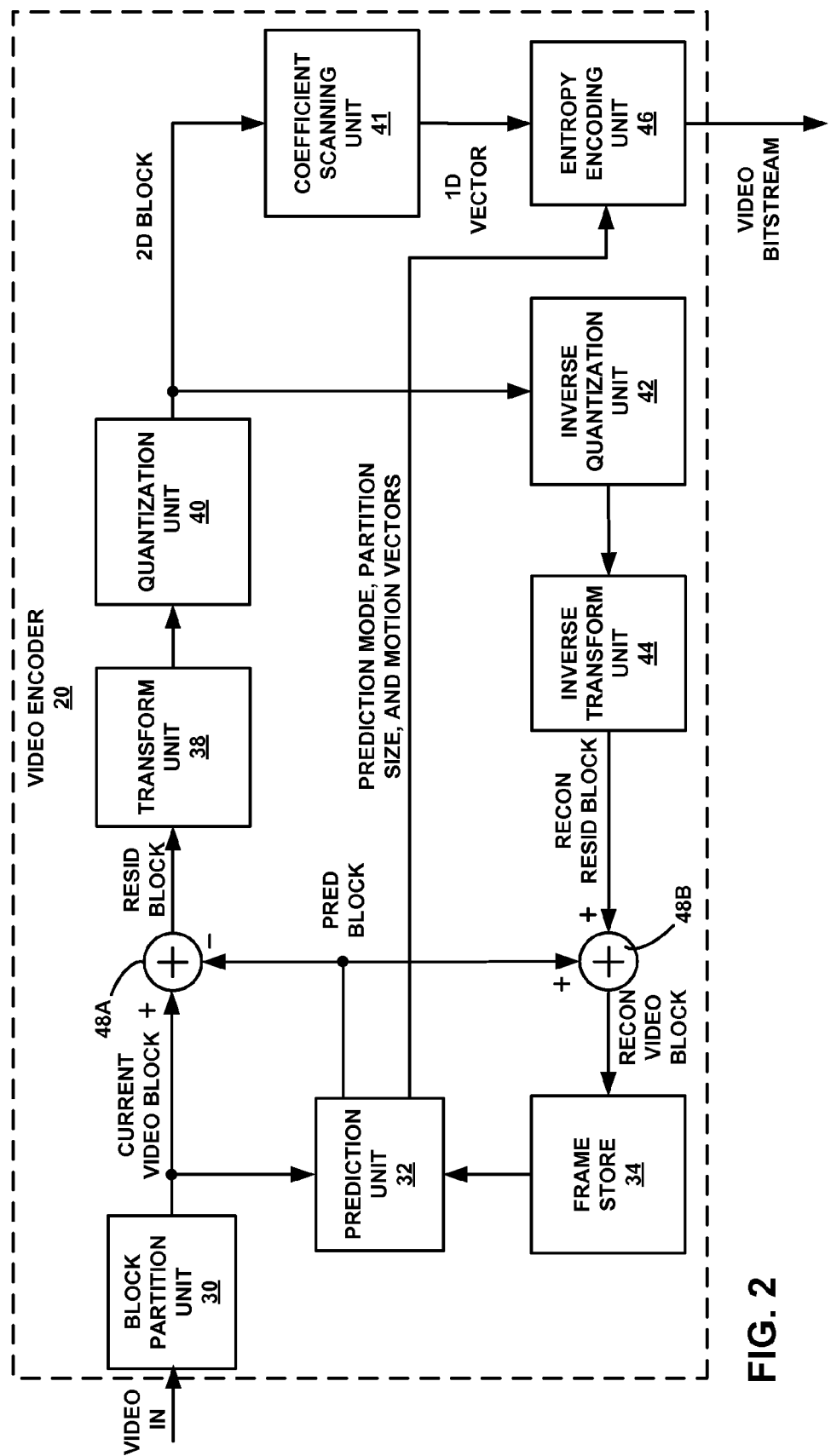
FIG. 2 is a block diagram illustrating an example of the video encoder of FIG. 1 in further detail.

FIG. 2 is a block diagram illustrating example video encoder 20 of FIG. 1 in further detail. Video encoder 20 performs intra- and inter-coding of blocks within video frames. Intra-coding relies on spatial prediction to reduce or remove spatial redundancy in video data within a given video coding unit, e.g., frame or slice. For intra-coding, video encoder 20 forms a spatial prediction block based on one or more previously encoded blocks within the same coding unit as the block being coded. Inter-coding relies on temporal prediction to reduce or remove temporal redundancy within adjacent frames of a video sequence. For inter-coding, video encoder 20 performs motion estimation to track the movement of closely matching video blocks between two or more adjacent frames.

In the example of FIG. 2, video encoder 20 includes a block partition unit 30, prediction unit 32, frame store 34, transform unit 38, quantization unit 40, coefficient scanning unit 41, inverse quantization unit 42, inverse transform unit 44 and entropy encoding unit 46. Video encoder 20 also includes summers 48A and 48B ("summers 48"). An in-loop deblocking filter (not shown) may be applied to reconstructed video blocks to reduce or remove blocking artifacts. Depiction of different features in FIG. 2 as units is intended to highlight different functional aspects of the devices illustrated and does not necessarily imply that such units must be realized by separate hardware or software components. Rather, functionality associated with one or more units may be integrated within common or separate hardware or software components.

Block partition unit 30 receives video information (labeled "VIDEO IN" in FIG. 2), e.g., in the form of a sequence of video frames, from video source 18 (FIG. 1). Block partition unit 30 divides each of the video frames into coding units that include a plurality of video blocks. As described above, the coding units may be an entire frame or a portion of a frame (e.g., slice of the frame). In one instance, block partition unit 30 may initially divide each of the coding units into a plurality of video blocks with a partition size of 16×16 (i.e., into macroblocks). Block partition unit 30 may further sub-divide each of the 16×16 video blocks into smaller blocks such as 8×8 video blocks or 4×4 video blocks.

Video encoder 20 performs intra- or inter-coding for each of the video blocks of the coding unit on a block by block basis based on the block type of the block. Prediction unit 32 assigns a block type to each of the video blocks that may indicate the selected partition size of the block as well as whether the block is to be predicted using inter-prediction or intra-prediction. In the case of inter-prediction, prediction unit 32 also decides the motion vectors. In the case of intra-prediction, prediction unit 32 also decides the prediction mode to use to generate a prediction block.

Prediction unit 32 then generates a prediction block. The prediction block may be a predicted version of the current video block. The current video block refers to a video block currently being coded. In the case of inter-prediction, e.g., when a block is assigned an inter-block type, prediction unit 32 may perform temporal prediction for inter-coding of the current video block. Prediction unit 32 may, for example, compare the current video block to blocks in one or more adjacent video frames to identify a block in the adjacent frame that most closely matches the current video block, e.g., a block in the adjacent frame that has a smallest MSE, SSD, SAD, or other difference metric. Prediction unit 32 selects the identified block in the adjacent frame as the prediction block.

In the case of intra-prediction, i.e., when a block is assigned an intra-block type, prediction unit 32 may generate the prediction block based on one or more previously encoded neighboring blocks within a common coding unit (e.g., frame or slice). Prediction unit 32 may, for example, perform spatial prediction to generate the prediction block by performing interpolation using one or more previously encoded neighboring blocks within the current frame. The one or more adjacent blocks within the current frame may, for example, be retrieved from frame store 34, which may comprise any type of memory or data storage device to store one or more previously encoded frames or blocks.

Prediction unit 32 may perform the interpolation in accordance with one of a set of prediction modes. As described above, the set of prediction modes may include unidirectional prediction modes and/or multi-directional prediction modes. The multi-directional prediction modes define combinations of the unidirectional prediction modes. In one example, the set of prediction modes may include unidirectional prediction modes defined in the H.264/MPEG-4 Part 10 AVC standard and bidirectional prediction modes that define various combinations of two unidirectional prediction modes.

For an Intra 4×4 block type, for example, the set of prediction modes may include the nine unidirectional prediction modes defined in the H.264/MPEG-4 Part 10 AVC standard and a subset of the possible combinations of the unidirectional prediction modes. Thus, instead of supporting all 36 possible combinations of unidirectional prediction modes, video encoder 20 may support only a portion of the possible combinations of unidirectional prediction modes. Doing so may not result in much coding degradation. One example set of intra-prediction modes, which includes 18 total intra-prediction modes, is provided below.

Mode 0: Vertical
 Mode 1: Horizontal
 Mode 2: DC
 Mode 3: Diagonal down/left
 Mode 4: Diagonal down/right
 Mode 5: Vertical right
 Mode 6: Horizontal down
 Mode 7: Vertical left
 Mode 8: Horizontal up
 Mode 9: Vertical +horizontal (Mode 0+Mode 1)
 Mode 10: DC +vertical (Mode 2+Mode 0)
 Mode 11: DC +horizontal (Mode 2+Mode 1)
 Mode 12: Diagonal down/left+horizontal (Mode 3+Mode 1)
 Mode 13: Diagonal down/right+vertical (Mode 4+Mode 0)
 Mode 14: Vertical right+horizontal (Mode 5+Mode 1)

Mode 15: Horizontal down+vertical (Mode 6+Mode 0)
Mode 16: Vertical left+horizontal (Mode 7+Mode 1)
Mode 17: Horizontal up+vertical (Mode 8+Mode 0)

In the example set illustrated above, modes 0-8 are unidirectional prediction modes and modes 9-17 are bidirectional prediction modes. In particular, modes 0-8 are the Intra 4×4 prediction modes defined in the H.264/MPEG-4 Part 10 AVC standard. Modes 9-17 are a subset of the possible bidirectional prediction modes. The subset of the possible bidirectional prediction modes in the provided example includes at least one combination that incorporates each unidirectional prediction modes. Each bidirectional prediction mode, besides the bidirectional prediction modes that include the DC prediction mode (e.g., mode 10 and 11), combine unidirectional prediction modes having interpolation directions that are non-parallel and, in some instances, substantially orthogonal to one another. In other words, the subset of bidirectional prediction modes includes bidirectional prediction modes that generally combine prediction modes from the "vertical" category with prediction modes from the "horizontal" category. Such bidirectional prediction modes allow the intra-prediction process to combine available prediction pixels from locations that are farther apart, thus improving prediction quality for more pixel locations within the current video block.

The set of prediction modes described above is described for purposes of illustration. The set of prediction modes may include more or fewer prediction modes. For example, the set of prediction modes may include more or fewer bidirectional prediction modes, or no bidirectional prediction modes. In other instances, the set of prediction modes may include only a subset of the unidirectional prediction modes. Additionally, the set of prediction modes may include multi-directional prediction modes that combine more than two unidirectional prediction modes in addition to or instead of the bidirectional prediction modes. Furthermore, although described above in reference to Intra 4×4 block types, the techniques of this disclosure may apply to other intra block types (e.g., Intra 8×8 block types or Intra 16×16 block types) or inter block types.

To determine which one of the plurality of prediction modes to select for a particular block, prediction unit 32 may estimate a coding cost, e.g., Lagrangian cost, for each of the prediction modes of the set, and select the prediction mode with the smallest coding cost. In other instances, prediction unit 32 may estimate the coding cost for only a portion of the set of possible prediction modes. For example, prediction mode 32 may select the portion of the prediction modes of the set based on the prediction mode selected for one or more neighboring video blocks. Prediction unit 32 generates a prediction block using the selected prediction mode.

After generating the prediction block, video encoder 20 generates a residual block by subtracting the prediction block produced by prediction unit 32 from the current video block at summer 48A. The residual block includes a set of pixel difference values that quantify differences between pixel values of the current video block and pixel values of the prediction block. The residual block may be represented in a two-dimensional block format (e.g., a two-dimensional matrix or array of pixel values). In other words, the residual block is a two-dimensional representation of the pixel values.

Transform unit 38 applies a transform to the residual block to produce residual transform coefficients. Transform unit 38 may, for example, apply a DCT, an integer transform, directional transform, wavelet transform, or a combination thereof. Transform unit 38 may selectively apply transforms to the residual block based on the prediction mode selected by prediction unit 32 to generate the prediction block. In other words, the transform applied to the residual information may be dependent on the prediction mode selected for the block by prediction unit 32.

Transform unit 38 may maintain a plurality of different transforms and selectively apply the transforms to the residual block based on the prediction mode of the block. The plurality of different transforms may include DCTs, integer transforms, directional transforms, wavelet transforms, or combinations thereof. In some instances, transform unit 38 may maintain a DCT or integer transform and a plurality of directional transforms, and selectively apply the transforms based on the prediction mode selected for the current video block. Transform unit 38 may, for example, apply the DCT or integer transform to residual blocks with prediction modes that exhibit limited directionality and apply one of the directional transforms to residual blocks with prediction modes that exhibit significant directionality.

Using the example set of prediction modes described above, transform unit 38 may apply the DCT or integer transform to modes 2, 9 and 12-17. These modes may exhibit limited directionality as they are either DC prediction, or a combination of two prediction modes at approximately orthogonal directions. To the contrary, modes 1, 3-8, 10 and 11 are modes that may exhibit directionality, and therefore transform unit 38 may apply different directional transforms for each of these modes to achieve better energy compaction of the residual video blocks. In other words, when prediction modes that have stronger directionality are chosen, directionality may also be manifested in the residual blocks of such prediction modes. And residual blocks of different prediction modes exhibit different directionality characteristics. As such, compared to transforms such as DCT or DCT-like integer transform, directional transforms specifically trained for each prediction mode may provide better energy compaction for the residual blocks of the given prediction mode. On the other hand, for prediction modes that do not carry strong directionality, transforms such as DCT or DCT-like integer transform provide sufficient energy compaction. In this manner, transform unit 38 does not need to maintain separate transforms for each of the possible prediction modes, thus lowering transform storage requirements. Moreover, application of DCT and/or integer transforms is less complex in terms of computational complexity.

In other instances, transform unit 38 may maintain a different directional transform for each of the possible prediction modes, and apply the corresponding directional transforms based on the selected prediction mode of the block. For the example set of prediction modes described above, transform unit 38 may maintain eighteen different directional transforms, each of which corresponds with one of the eighteen possible Intra 4×4 prediction modes. Additionally, transform unit 38 may maintain eighteen different directional transforms for the eighteen possible Intra 8×8 prediction modes, and four different directional transforms for the four possible Intra 16×16 prediction modes, and transforms for any other prediction modes of other partition sizes. Applying separate directional transforms based on the selected prediction mode of the block increases the efficiency with which the residual energy is captured, particularly for blocks for which prediction modes that exhibit significant directionality are selected. The directional transforms may be non-separable directional transforms, e.g., derived from non-separable Karhunen L6eve Transforms (KLTs), or separable directional transforms. In some instances, the directional transforms may be pre-computed using training sets of data.

The KLT is a linear transform where the basis functions are derived from the statistics of the signal, and can thus be adaptive. A KLT is designed to place as much energy in as few coefficients as possible. A KLT is generally not separable, and thus transform unit 38 performs full matrix multiplication as described in detail below. Application of a non-separable directional transform to a 4×4 residual block will be described for exemplary purposes. Similar techniques are used for blocks of different sizes, e.g., 8×8 block or 16×16 blocks.

A 4×4 residual block X is represented in a two-dimensional block format with four rows and four columns of pixel values, i.e., a total of sixteen pixel values. To apply a non-separable directional transform, the 4×4 residual block is re-arranged into a one-dimensional vector x of pixel values, i.e., of length sixteen. The 4×4 residual block X is re-arranged into vector x by arranging the pixels in X in the raster scan order. That is, if 4×4 residual block X is written as $$X = \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix},$$

then residual vector x of length 16 is written as $$x = [x_{00} \; x_{01} \; x_{02} \; x_{03} \; x_{10} \; x_{11} \; x_{12} \; x_{13} \; x_{20} \; x_{21} \; x_{22} \; x_{23} \; x_{30} \; x_{31} \; x_{32} \; x_{33}].$$

A transform coefficient vector y is obtained by performing matrix multiplication in accordance with the following equation (1):

$$y=Tx, \qquad (1)$$

where T is the transform matrix of size 16×16 that corresponds to the prediction mode selected for the block. The transform coefficient vector y is also a one-dimensional vector having a length of sixteen coefficients.

Use of non-separable directional transforms may entail increased computational cost and storage requirements. In general, for a residual block of size N×N, the non-separable directional transform requires basis functions of size $N^2 \times N^2$. That is, for 4×4 residual blocks, the non-separable directional transform has a size of 16×16; for 8×8 residual blocks, the non-separable directional transform has a size of 64×64; and for 16×16 residual blocks, the non-separable directional transform has a size of 256×256. Because a different non-separable directional transform may be used for each of the prediction modes of the set, transform unit 32 may store eighteen 16×16 directional transforms for 4×4 blocks and eighteen 64×64 transforms for 8×8 blocks (in the case of the example set of prediction modes described above), and possibly more if the set of prediction modes is larger. This may result in the use of large memory resources to store the transform matrices needed to carry out the transform process. Computational cost of non-separable directional transforms is also high. In general, applying a non-separable directional transform on an N×N block requires $N^2 \times N^2$ multiplications and $N^2 \times (N^2-1)$ additions.

Instead of non-separable directional transforms, transform unit 32 may maintain separable directional transforms for each of the prediction modes. Separable directional transforms have a lower storage and computational cost compared to non-separable directional transforms. For the 4×4 residual block X, for example, the separable transform is applied as indicated by the following equation (2):

$$Y=CXR, \qquad (2)$$

where Y is the resulting transform coefficient matrix, C is a column transform matrix and R is a row transform matrix, all of which have a size equal to the size of the block (e.g., 4×4 in this example). Thus, the resulting transform coefficient matrix Y is also a two-dimensional matrix of size 4×4.

For each prediction mode, transform unit 32 may store two N×N transform matrices (e.g., matrix pairs C and R), where N×N corresponds with the block size (e.g., N=4, 8 or 16). In the example set of eighteen prediction modes for a 4×4 block described above, transform unit 32 stores thirty-six 4×4 transform matrices, which requires less storage than the eighteen 16×16 transform matrices stored when non-separable transforms are used. Additionally, transform unit 32 may perform the separable directional transform using 2×N×N×N multiplications and 2×N×N×(N−1) additions, which is significantly less operations than the $N^2 \times N^2$ multiplications and $N^2 \times (N^2-1)$ additions used for performing the non-separable directional transforms. Table 1 compares the storage and computation requirements between using separable vs. non-separable directional transforms for block sizes of 4×4 and 8×8. Comparison between separable and non-separable directional transforms for 16×16 blocks may be done in a similar manner. As illustrated in Table 1, using separable directional transforms provides reduction in both computation complexity and storage requirement compared to non-separable directional transforms, and the reduction becomes more significant for bigger block sizes, e.g., reduction for 8×8 blocks is bigger than reduction for 4×4 blocks.

TABLE 1

Complexity of non-separable vs. separable directional transforms

| | Block size | Non-separable transform | Separable transform |
|---|---|---|---|
| Storage for all modes (in bytes) | 4 × 4 | 18 × 16 × 16 = 4608 | 18 × 2 × 4 × 4 = 576 |
| | 8 × 8 | 18 × 64 × 64 = 73728 | 18 × 2 × 8 × 8 = 2304 |
| Computation per block | 4 × 4 | 256 multiplication operations 240 addition operations | 128 multiplication operations, 96 addition operations |
| | 8 × 8 | 4096 multiplication operations 4032 addition operations | 1024 multiplication operations 896 addition operations |

The separable transform matrices for each prediction mode may be obtained using prediction residuals from a set of training video sequences. Similar to the derivation of a non-separable KLT transform, the singular value decomposition (SVD) process may be applied to the prediction residuals in the training set first in the row direction and then in the column direction in order to obtain the row transform matrix and the column transform matrix, respectively. Alternatively, non-separable directional transform matrices, i.e., the non-separable KLT transform matrices, may be trained first using the prediction residuals from the training set; then, the separable transform matrices for each prediction mode may be obtained by further decomposing the non-separable transform matrices into separable transform matrices.

Either way, the resulting transform matrices usually have floating point precision. Fixed-point precision numbers are used to approximate the coefficients in the transform matrices to enable the use of fixed point arithmetic in the transform process and to reduce computation cost. Precision of the fixed-point approximations of the coefficients in the transform matrices is decided by finding a balance between computation complexity and maximum precision needed during the transform process using fixed point arithmetic. In other words, higher precision of the fixed-point approximations of the transform matrices may result in smaller errors due to the use of fixed-point approximation, which is desirable, but too high precision in the fixed-point approximations of the transform matrices also may cause the fixed-point arithmetic to overflow during the transform process, which is not desirable.

After applying the transform to the residual block of pixel values, quantization unit 40 quantizes the transform coefficients to further reduce the bit rate. Following quantization, inverse quantization unit 42 and inverse transform unit 44 may apply inverse quantization and inverse transformation, respectively, to reconstruct the residual block (labeled "RECON RESID BLOCK" in FIG. 2). Summer 48B adds the reconstructed residual block to the prediction block produced by prediction unit 32 to produce a reconstructed video block for storage in frame store 34. The reconstructed video block may be used by prediction unit 32 to intra- or inter-code a subsequent video block.

As described above, when separable transforms are used, which include DCT, the integer transforms used in H.264/AVC, and separable directional transforms, the resulting transform coefficients are represented as two-dimensional coefficient matrices. Therefore, following quantization, coefficient scanning unit 41 scans the coefficients from the two-dimensional block format to a one-dimensional vector format, a process often referred to as coefficient scanning. In particular, coefficient scanning unit 41 scans the coefficients in accordance with a scan order. In accordance with one aspect of this disclosure, coefficient scanning unit 41 may adaptively adjust the scan order used for coefficient scanning based on one or more coefficient statistics. In some instances, coefficient scanning unit 41 may adaptively adjust the scan order separately for each of the prediction modes since each of the prediction modes may have different coefficient statistics.

Coefficient scanning unit 41 may initially scan the coefficients of the quantized residual block using a first scan order. In one aspect, the first scan order may be a zig-zag scan order, which is typically used in H.264/MPEG-4 Part 10 AVC applications. Although coefficient scanning unit 41 is described as initially scanning using the zig-zag scan order, the techniques of this disclosure are not limited to any particular initial scan order or technique. Moreover, each of prediction modes may have a different initial scan order, e.g., a scan order specifically trained for that prediction mode. The zig-zag scan order, however, is described for purposes of illustration. The zig-zag scan order arranges the quantized coefficients in the one-dimensional vector such that the coefficients in the upper left corner of the two-dimensional block are compacted toward the beginning of the coefficient vector. The zig-zag scan order may provide sufficient compactness for coefficient blocks that have limited directionality.

When the residual blocks have some or significant directionality and are transformed using separable directional transforms, the resulting two-dimensional transform coefficient block may still carry some amount of directionality. This is because while using separable directional transforms offers the benefits of lower computation complexity and storage requirement, it may not capture the directionality in the residual blocks as well as using non-separable directional transforms. As an example, after application of the directional transform to the vertical prediction (mode 0 of the example described above), the non-zero coefficients tend to exist along the horizontal direction. Thus, the zig-zag scan order may not result in all of the non-zero coefficients being compacted toward the beginning of the coefficient vector. By adapting the coefficient scan order to orient the scan order in the horizontal direction instead of the fixed zig-zag scan order, the non-zero coefficients of the coefficient block may be more compacted toward the beginning of the one-dimensional coefficient vector than would be the case if scanned in the zig-zag scan order. This may in turn reduce the number of bits spent on entropy coding since there are shorter runs of zeros between non-zero coefficients at the beginning of the one-dimensional coefficient vector and one longer run of zeros at the end of the one-dimensional coefficient vector. The concept of adapting the scan order used to generate the one-dimensional coefficient vector also applies to other prediction modes. For example, coefficient scanning unit 41 may adaptively adjust the scan order separately for each of the prediction modes since each of the prediction modes may have different directionality in the coefficient blocks and hence different coefficient statistics. In this manner, the scan order may be different for each of the prediction modes.

As described above, the initial scan order may not be the zig-zag scan order, particularly for instances in which directional transforms are applied to the residual block. In these cases, the initial scan order may be pre-determined using one of the techniques described below. As one example, the initial scan order may be determined using a set of training video sequences. Statistics of non-zero coefficients, such as the statistics described below, are gathered for each prediction mode and used to initialize the coefficient scanning order. In particular, the position with the highest probability of non-zero coefficients is the first coefficient position of the initial scan order, then the position with the next highest probability of non-zero coefficients is the second coefficient position of the initial scan order, and so on until the one with smallest non-zero probability which is the last coefficient position of the initial scan order. Alternatively, the initial scan order may be determined based on the magnitudes of the eigenvalues of the separable transform matrices. For example, the eigenvalues may be sorted into descending order and coefficients are scanned following the corresponding order of eigenvalues.

Even if the initial scan order is determined using one of the techniques described above, various types of video sources may result in quantized residual coefficients being located in different coefficient positions within the block. For example, video sources of different resolutions, e.g., common intermediate format (CIF), quarter-CIF (QCIF) and high-definition (e.g., 720p/i or 1080p/i) video sources, may result in non-zero coefficients being located in different coefficient positions within the block. Thus, even if the initial scan order is selected based on the prediction mode of the block, coefficient scanning unit 41 may still adapt the scan order to improve the compactness of the non-zero coefficients toward the beginning of the one-dimensional coefficient vector.

To adapt the scan order, coefficient scanning unit 41, or other unit of video encoder 20, may collect one or more coefficient statistics for one or more blocks. In other words, as coefficient scanning is performed block by block, coefficient scanning unit 41 may collect statistics that indicate the number of times each of the positions within the block has a non-zero coefficient. For example, coefficient scanning unit 41 may maintain a plurality of counters that each correspond with a coefficient position in the two-dimensional block, and increment the counter corresponding to the position when a non-zero coefficient is located at that respective position. In this manner, high count values correspond with positions in the block at which non-zero coefficients occur with greater frequency and low count values correspond with positions in the block at which a non-zero coefficient occur with less frequency. In some instances, coefficient scanning unit 41 may collect separate sets of coefficient statistics for each of the prediction modes.

As described above, coefficient scanning unit 41 may adapt the scan order based on the collected statistics. Coefficient scanning unit 41 may, based on the collected statistics, adapt the scan order to scan coefficient positions that are determined to have a higher likelihood of having non-zero coefficients before coefficient locations that are determined to have a smaller likelihood of having non-zero coefficients. For example, coefficient scanning unit 41 may adapt the scan order to scan the coefficient positions of the two-dimensional block in descending order based on their count values when the count values represent the number of times the respective coefficient locations have a non-zero value. Alternatively, the counters may track the number of times each of the positions within the block has been the location for a zero-valued coefficient and adapt the scan order to scan the coefficient positions in ascending order based on their count values. In some instances, statistics may only be collected for a subset of the coefficient positions of the block instead of all of the coefficient positions of the block. In this case, coefficient scanning unit 41 may only adapt part of the scan order.

Coefficient scanning unit 41 may adapt the scan order at fixed or non-fixed intervals. For example, coefficient scanning unit 41 may adapt the scan order at fixed intervals, such as block boundaries. In some instances, coefficient scanning unit 41 may adapt the scan order at 4×4 or 8×8 block boundaries, or at macroblock boundaries. In this manner, the scan order may be adapted for each block or macroblock. To lower system complexity, however, coefficient scanning unit 41 may adapt the scan order less frequently, such as after every n blocks or macroblocks. Alternatively, coefficient scanning unit 41 may adapt the scan order at non-fixed intervals. Coefficient scanning unit 41 may, for example, adapt the scan order when one of the count values of a position within the block exceeds a threshold value. After adapting the scan order, coefficient scanning unit 41 may scan subsequent quantized residual blocks of at least one subsequent video block using the adapted scan order. In some instances, coefficient scanning unit 41 may scan subsequent quantized residual blocks of at least one subsequent video block using the adapted scan order when the at least one subsequent video block exists in a coding unit of the first video block. Coefficient scanning unit 41 may continue to scan subsequent video blocks until the scan order is adapted again in accordance with the collected statistics or the scan order is re-initialized. In this manner, coefficient scanning unit 41 adapts the scan order to generate the one-dimensional coefficient vector in such a manner that the quantized residual coefficients may be more efficiently encoded by the entropy coding unit 46.

Coefficient scanning unit 41 may, in some instances, normalize the collected statistics. Normalization of the collected statistics may be desirable when coefficient counts reach a threshold value. A coefficient position, herein referred to as coefficient position A, within the block that has a count value that has reached the threshold may, for example, remain the coefficient location with the highest count even when the coefficient location has not had a non-zero coefficient for a period of time. This is due to the coefficient count at position A being so large that other coefficient counts may take multiple blocks (e.g., tens or hundreds of blocks) before the coefficient count of another position, herein referred to as coefficient position B, within the block exceeds the coefficient count at position A and results in a change (i.e., swapping) of the scanning order between coefficient positions A and B. Thus, to allow video encoder 20 to adapt more quickly to local coefficient statistics, coefficient scanning unit 41 may normalize the coefficients when one of the counts reaches the threshold value. For example, coefficient scanning unit 41 may normalize the coefficients by reducing each of the count values by a pre-determined factor, such as reducing each of the count values by a factor of two, or by resetting the count values to a set of initial count values. Coefficient scanning unit 41 may utilize other normalization methodologies. For example, coefficient scanning unit 41 may refresh the statistics after coding a particular number of blocks.

Entropy encoding unit 46 receives the one-dimensional coefficient vector that represents the residual coefficients of the block as well as block header information for the block in the form of one or more header syntax elements. The header syntax elements may identify particular characteristics of the current video block, such as a block type, a prediction mode, coded block pattern (CBP) for luma and chroma, a block partition, and one or more motion vectors. These header syntax elements may be received from other components, for example, from prediction unit 32, within video encoder 20.

Entropy encoding unit 46 encodes the header information and the residual information for the current video block to generate an encoded bitstream (labeled "VIDEO BITSTREAM" in FIG. 2). Entropy encoding unit 46 encodes one or more of the syntax elements of each of the blocks in accordance with the techniques described in this disclosure. In particular, entropy encoding unit 46 may encode the syntax elements of the current block based on the syntax elements of one or more previously encoded video blocks. As such, entropy encoding unit 46 may include one or more buffers to store the syntax elements of the one or more previously encoded video blocks. Entropy encoding unit 46 may analyze any number of neighboring blocks at any location to assist in encoding the syntax elements of the current video block. For purposes of illustration, entropy encoding unit 46 will be described as encoding the prediction mode based on a previously encoded block located directly above the current block (i.e., upper neighboring block) and a previously encoded block located directly to the left of the current block (i.e., left neighboring block). However, similar techniques may be used for encoding other header syntax elements, such as block types, block partitions, CBPs, or the like. Also, similar techniques that involve more neighboring blocks than just the upper and left neighboring blocks in the coding of the current video block may be used.

Operation of entropy encoding unit 46 will be described with reference to the set of eighteen prediction modes described above and in view of the example pseudo code below.

```
Let upMode be the prediction mode of the top block
Let leftMode be the prediction mode of the left block
Let currMode be the prediction mode of the current block
If currMode == upMode || currMode == leftMode
    Send "1"
    If upMode != leftMode
        Send "1" if currMode == upMode or "0" otherwise
Else
    Send "0"
```

-continued

Adjust currMode to be in the range of [0,15]
Send currMode using 4 bits

Entropy encoding unit 46 initializes variables upMode, leftMode, and currMode to be equal to the prediction mode of the upper neighboring block, the prediction mode of the left neighboring block, and the prediction mode of the current block, respectively. As described above, the prediction modes of the upper neighboring block, the left neighboring block and the current block may be determined based on a Lagrangian cost analysis. Entropy encoding unit 46 compares the prediction mode of the current bock (currMode) with the prediction mode of the neighboring blocks (upMode and leftMode). If the prediction mode of the current block is equal to the prediction mode of either of the neighboring blocks, entropy encoding unit 46 encodes a "1," Thus, the first bit encoded by entropy encoding unit 46 to represent the prediction mode of the current block indicates whether the current prediction mode is the same as either the prediction mode of the upper neighboring block or the prediction mode of the left neighboring block.

If the prediction mode of the current block is equal to the prediction mode of either of the neighboring blocks, i.e., the first encoded bit is a "1," entropy encoding unit 46 compares the prediction mode of the upper neighboring block to the prediction mode of the left neighboring block. If the prediction mode of the upper neighboring block is the same as the prediction mode of the left neighboring block, entropy encoding unit 46 does not encode any more bits for the prediction mode. In this case, the prediction mode may be encoded using a single bit.

However, if the prediction mode of the upper neighboring block is not equal to the prediction mode of the left neighboring block, entropy encoding unit 46 encodes at least one additional bit representing the prediction mode to specify which of the neighboring blocks has the same prediction mode as the current block. For example, when entropy encoding unit 46 analyzes the prediction mode of the upper and left neighboring blocks, entropy encoding unit 46 may encode a "1" if the prediction mode of the current block is the same as the prediction mode of the upper neighboring block and encodes a "0" if the prediction mode of the current block is the same as the prediction mode of the left neighboring block. Entropy encoding unit 46 may, alternatively, encode a "1" if the prediction mode of the current block is the same as the prediction mode of the left neighboring block and encodes a "0" if the prediction mode of the current block is the same as the prediction mode of the upper neighboring block. In either case, the second bit of the encoded prediction mode indicates which one of the upper or left neighboring block has the same prediction mode as the prediction mode of the current block. In this manner, entropy encoding unit 46 may encode the prediction mode of the current block using as few as one bit and, at most, two bits when the prediction mode of the current block is equal to the prediction mode of one of the neighboring blocks. If entropy encoding unit 46 analyzes more than two neighboring blocks, entropy encoding unit 46 may encode more than one additional bit to specify which of the previously encoded blocks has the same prediction mode as the current block.

If the prediction mode of the current video block is not the same as either the prediction mode of the upper neighboring block or the prediction mode of the left neighboring block, entropy encoding unit 46 sends a "0," which indicates that the prediction mode of the current video block is not the same as the prediction modes of either of the neighboring blocks. Entropy encoding unit 46 encodes a codeword that represents the prediction mode of the current block. Using the set of eighteen prediction modes described above as an example, entropy encoding unit 46 may encode the prediction mode of the current video block using a four bit codeword. Although there are eighteen possible prediction modes, which typically require five bit codewords, two of the possible prediction modes may have already been eliminated from the set for the current block, i.e., the prediction modes of the upper neighboring block and the left neighboring block because the prediction modes of the upper neighboring block and the left neighboring block have already been compared to the prediction mode of the current block and decided to be not equal to the prediction mode of the current block. When the upper neighboring block and the left neighboring block have the same prediction mode, however, seventeen prediction modes instead of sixteen prediction modes remain possible, again requiring a five bit codeword rather than a four bit codeword to represent. In this case, during the prediction process, prediction unit 32 may selectively remove one of the remaining seventeen coding modes from the set to enable the prediction mode of the current block to be represented using a four bit codeword. In one instance, prediction unit 32 may remove the last prediction mode, e.g., prediction mode 17 in this example. Prediction unit 32 may, however, select any of the prediction modes of the set to be removed using any other of a variety of methodologies. For example, prediction unit 32 may keep track of the probability of each prediction mode being selected, and remove the prediction mode with the lowest probability of being selected.

After removing the selected prediction mode, entropy encoding unit 46 adjusts the range of the sixteen remaining prediction modes such that the prediction mode numbers range from [0, 15]. In one example, entropy encoding unit 46 may temporarily renumber the remaining prediction modes from 0 to 15 beginning with assigning 0 to the remaining prediction mode with the smallest mode number and ending with assigning 15 to the remaining prediction mode with the largest prediction mode number. For example, if the prediction mode of the upper neighboring block is mode 12 and the prediction mode of the left neighboring block is mode 14, entropy encoding unit 46 may renumber prediction mode 13, prediction mode 15, prediction mode 16 and prediction mode 17 as prediction mode 12, prediction mode 13, prediction mode 14 and prediction mode 15, respectively. Entropy encoding unit 46 then encodes the prediction mode using four bits. In other examples with sets of prediction modes with more or fewer possible prediction modes, entropy encoding unit 46 may encode the prediction mode with more or fewer bits using similar techniques.

Entropy encoding unit 46 may encode the prediction mode of the current video block using CAVLC or CABAC. A strong correlation may exist between the prediction mode of the current block and the prediction modes of the upper and left neighboring blocks. In particular, when the prediction mode of the upper neighboring block and the prediction mode of the left neighboring block are both unidirectional prediction modes, the probability of the prediction mode of the current block also being one of the unidirectional prediction modes is high. Likewise, when the prediction mode of the upper neighboring block and the prediction mode of the left neighboring block are both bidirectional prediction modes, the probability of the prediction mode of the current block also being one of the bidirectional prediction modes is high. In this manner, the probability distributions of the prediction mode of the current block changes when the categories (e.g., unidirectional vs. bidirectional) of the prediction modes of the upper and left neighboring blocks change.

As such, entropy encoding unit 46 may select, in some aspects, different coding contexts depending on whether the prediction modes of one or more previously encoded video blocks (e.g., the upper and left neighboring video blocks) are unidirectional or bidirectional. In the case of CABAC, different coding contexts reflect the different probabilities of the set of prediction modes within the given context. Take for example the coding context, herein referred to as "the first coding context," that corresponds to the case when both the upper and the left neighboring coding blocks have unidirectional prediction modes. Because of neighboring correlation, the first coding context may assign higher probabilities to the unidirectional prediction modes than the bidirectional prediction modes. Thus, when the first coding context is selected for CABAC encoding (i.e., both upper and left neighboring prediction modes are unidirectional), fewer bits may be spent on coding the current prediction mode if the current prediction mode is one of unidirectional prediction modes compared with if the current prediction mode is one of bidirectional prediction modes. In the case of CAVLC, different VLC coding tables may be defined for different coding contexts. For example, when the first coding context is selected (i.e., both upper and left neighboring blocks have unidirectional prediction modes), a VLC coding table that assigns shorter codewords to unidirectional prediction modes than bidirectional prediction modes may be used.

This way, entropy encoding unit 46 may select the first coding context when the prediction mode of the upper video block and the prediction mode of the left video block are both unidirectional prediction modes. Entropy encoding unit 46 may select a different coding context when the prediction mode of the upper video block and the prediction mode of the left video block are not both unidirectional prediction modes. For example, entropy encoding unit 46 may select a second coding context when the prediction mode of the upper neighboring video block and the prediction mode of the left neighboring video block are both bidirectional prediction modes. The second coding context models the probability distribution for the prediction mode of the current video block when the prediction mode of both of the upper and the left neighboring blocks are bidirectional. The probability distribution of the second coding context may assign higher probabilities to the bidirectional prediction modes than the unidirectional prediction modes in the case of CABAC coding and assign shorter codewords to bidirectional prediction modes than unidirectional prediction modes in the case of CAVLC coding.

Entropy encoding unit 46 may select yet a third coding context when the prediction mode of one of the neighboring blocks is a unidirectional prediction mode and the prediction mode of the other one of the neighboring blocks is a bidirectional prediction mode. The third coding context more evenly distributes the probability of the current prediction mode among the unidirectional prediction modes and the bidirectional prediction modes of the set. Selecting different coding contexts for use in encoding based on whether the prediction modes of one or more previously encoded video blocks (e.g., the upper and left video blocks) are unidirectional or bidirectional may result in better compression of the prediction mode information.

Figure 3:
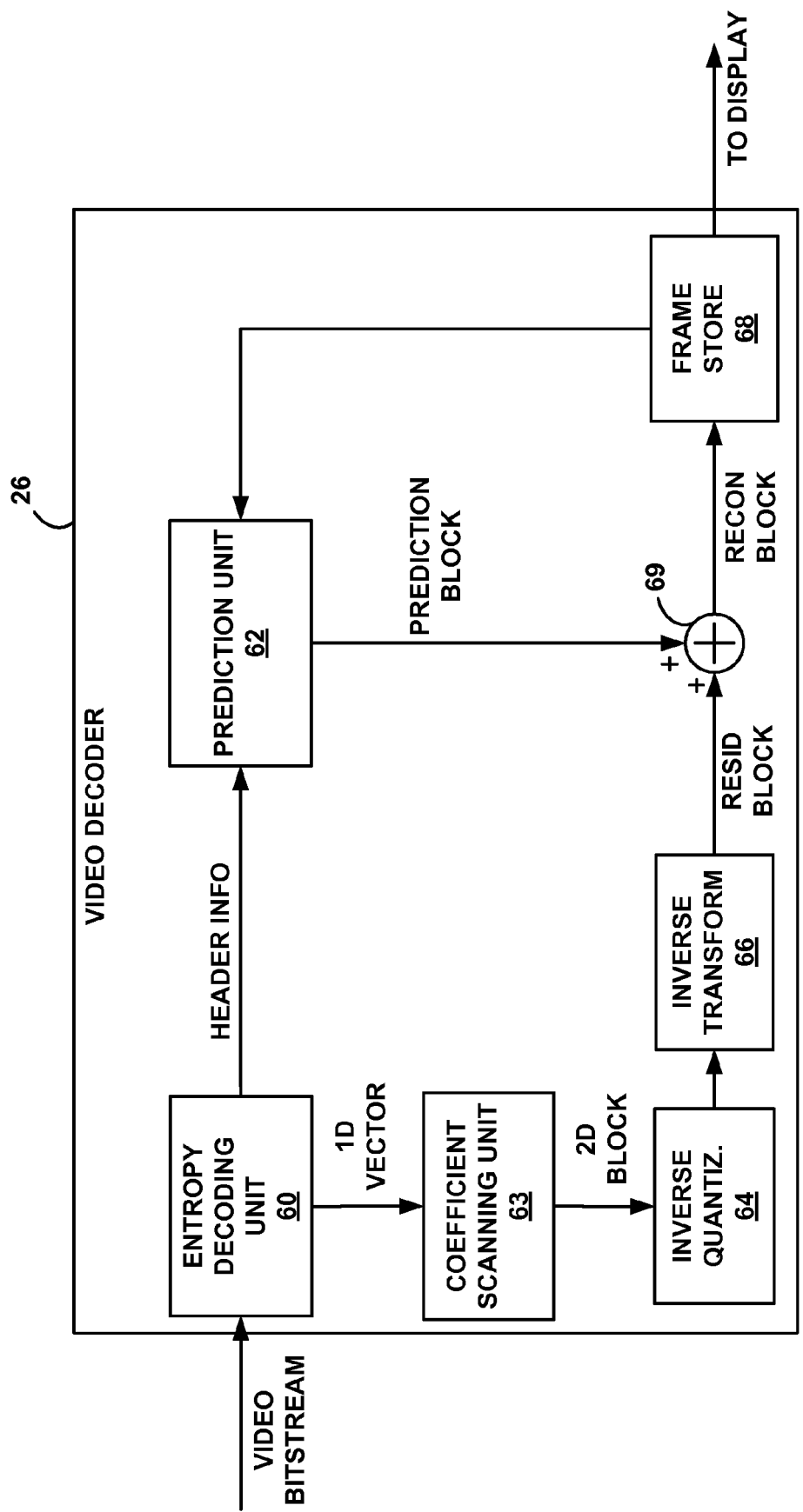
FIG. 3 is a block diagram illustrating an example of the video decoder of FIG. 1 in further detail.

FIG. 3 is a block diagram illustrating example of video decoder 26 of FIG. 1 in further detail. Video decoder 26 may perform intra- and inter-decoding of blocks within coded units, such as video frames or slices. In the example of FIG. 3, video decoder 26 includes an entropy decoding unit 60, prediction unit 62, coefficient scanning unit 63, inverse quantization unit 64, inverse transform unit 66, and frame store 68. Video hdecoder 26 also includes summer 69, which combines the outputs of inverse transform unit 66 and prediction unit 62.

Entropy decoding unit 60 receives the encoded video bitstream (labeled "VIDEO BITSTREAM" in FIG. 3) and decodes the encoded bitstream to obtain residual information (e.g., in the form of a one-dimensional vector of quantized residual coefficients) and header information (e.g., in the form of one or more header syntax elements). Entropy decoding unit 60 performs the reciprocal decoding function of the encoding performed by encoding module 46 of FIG. 2. Description of entropy decoding unit 60 performing decoding of a prediction mode syntax element is described for purposes of example. The techniques may be extended to decoding of other syntax elements, such as a block type, block partition, CBP, or the like.

In particular, entropy decoding unit 60 analyzes the first bit representing the prediction mode to determine whether the prediction mode of the current block is equal to the prediction mode of any of the previously decoded blocks analyzed, e.g., an upper neighboring block or a left neighboring block. Entropy decoding module 60 may determine that the prediction mode of the current block is equal to the prediction mode of one of the neighboring blocks when the first bit is "1" and that the prediction mode of the current block is not the same as the prediction mode of either of the neighboring blocks when the first bit is "0."

If the first bit is "1" and if the prediction mode of the upper neighboring block is the same as the prediction mode of the left neighboring block, entropy decoding unit 60 does not need to receive any more bits. Entropy decoding unit 60 selects the prediction mode of either of the neighboring blocks as the prediction mode of the current block. Entropy decoding unit 60 may, for example, include one or more buffers (or other memory) that stores the previous prediction modes of the one or more previously decoded blocks.

If the first bit is a "1" and if the prediction mode of the upper neighboring block is not the same as the prediction mode of the left neighboring block, entropy decoding unit 60 receives a second bit that represents the prediction mode, entropy decoding unit 60 determines which of the neighboring blocks has the same prediction mode as the current block based on the second bit. Entropy decoding unit 60 may, for example, determine that the prediction mode of the current block is the same as the prediction mode of the upper neighboring block when the second bit is "1" and determine the prediction mode of the current block is the same as the prediction mode of the left neighboring block when the second bit is "0." Entropy decoding unit 60 selects the prediction mode of the correct neighboring block as the prediction mode of the current block.

When the first bit is "0," however, entropy decoding unit 60 determines that the prediction mode of the current block is not the same as the prediction mode of either of the neighboring blocks. Therefore, entropy decoding unit 60 may remove the prediction modes of the upper and left neighboring blocks from the set of possible prediction modes. The set of possible prediction modes may include one or more unidirectional prediction modes and/or one or more multi-directional prediction modes. One example set of prediction modes that includes eighteen total prediction modes is provided above in the description of FIG. 2. If the upper and left neighboring blocks have the same prediction mode, entropy decoding unit 60 may remove the prediction mode of the neighboring blocks and at least one other prediction mode. As an example, entropy decoding module 60 may remove the prediction mode with the largest mode number (e.g., mode 17 in the eighteen prediction mode set described above). Entropy decoding unit 60 may, however, select any of the prediction modes of the set to be removed using other any of a variety of methodologies as long as decoding unit 60 removes the same prediction mode as removed by prediction unit 32. For example, entropy decoding unit 60 may remove the prediction mode that has the lowest probability of being selected.

Entropy decoding unit 60 may adjust the prediction mode numbers of the remaining prediction modes such that the prediction mode numbers range from 0-15. In one example, entropy encoding unit 46 may temporarily renumber the remaining prediction modes from 0 to 15 beginning with the remaining prediction mode with the smallest mode number and ending with the remaining prediction mode with the largest prediction mode number as described above with respect to FIG. 2. Entropy decoding unit 60 decodes the remaining bits, e.g., four bits in the example described, to obtain the prediction mode number of the remaining prediction modes that corresponds with the prediction mode of the current block.

In some instances, entropy decoding unit 60 may decode the prediction mode of the current video block using CAVLC or CABAC. Because a strong correlation may exist between the prediction mode of the current block and one or more previously decoded blocks (e.g., the prediction modes of the upper and left neighboring blocks), entropy decoding unit 60 may select different coding contexts for a prediction mode of the block based on the type of prediction mode of one or more previously decoded video blocks. In other words, entropy decoding unit 60 may select different coding contexts based on whether the prediction modes of the previously decoded blocks are unidirectional or bidirectional.

As one example, entropy decoding unit 60 may select a first coding context when the prediction modes of both previously decoded blocks are unidirectional prediction modes, select a second coding context when the prediction modes of both the previously decoded blocks are bidirectional prediction modes, and select a third coding context when the prediction mode of one of the previously decoded blocks is a unidirectional prediction mode and the prediction mode of the other one of the previously decoded blocks is a bidirectional prediction mode.

Prediction unit 62 generates a prediction block using at least a portion of the header information. For example, in the case of an intra-coded block, entropy decoding unit 60 may provide at least a portion of the header information (such as the block type and the prediction mode for this block) to prediction unit 62 for generation of a prediction block. Prediction unit 62 generates a prediction block using one or more adjacent blocks (or portions of the adjacent blocks) within a common coding unit in accordance with the block type and prediction mode. As an example, prediction unit 62 may, for example, generate a prediction block of the partition size indicated by the block type syntax element using the prediction mode specified by the prediction mode syntax element. The one or more adjacent blocks (or portions of the adjacent blocks) within the current coding unit may, for example, be retrieved from frame store 68.

Entropy decoding unit 60 also decodes the encoded video data to obtain the residual information in the form of a one-dimensional coefficient vector. If separable transforms (e.g., DCT, H.264/AVC integer transforms, separable directional transforms) are used, coefficient scanning unit 63 scans the one-dimensional coefficient vector to generate a two-dimensional block. Coefficient scanning unit 63 performs the reciprocal scanning function of the scanning performed by coefficient scanning unit 41 of FIG. 2. In particular, coefficient scanning unit 63 scans the coefficients in accordance with an initial scan order to place the coefficients of the one-dimensional vector into a two-dimensional format. In other words, coefficient scanning unit 63 scans the one-dimensional vector to generate the two-dimensional block of quantized coefficients.

Coefficient scanning unit 63 may adaptively adjust the scan order used for coefficient scanning based on one or more coefficient statistics to synchronize the scan order with the scan order used by video encoder 20. To do so, coefficient scanning unit 63 may collect one or more coefficient statistics for one or more blocks and adapt the scan order based on the collected statistics. In other words, as the two-dimensional block of quantized coefficients are reconstructed, coefficient scanning unit 63 may collect statistics that indicate the number of times each of the positions within the two-dimensional block has been the location for a non-zero coefficient. Coefficient scanning unit 63 may maintain a plurality of counters that each correspond with a coefficient position in the two-dimensional block, and increment the counter corresponding to the position when a non-zero coefficient is located at that respective position.

Coefficient scanning unit 63 may adapt the scan order based on the collected statistics. Coefficient scanning unit 63 may, based on the collected statistics, adapt the scan order to scan positions that have a higher likelihood of having non-zero coefficients before coefficient locations that are determined to have a smaller likelihood of having non-zero coefficients. Coefficient scanning unit 63 adapts the scan order at the same fixed or non-fixed intervals used by video encoder 20. Coefficient scanning unit 63 normalizes the collected statistics in the same manner as described above with respect to video encoder 20.

As described above, coefficient scanning unit 63 may, in some instances, collect separate coefficient statistics and adaptively adjust the scan order separately for each of the prediction modes. Coefficient scanning unit 63 may do so, for example, because each of the prediction modes may have different coefficient statistics.

After generating the two-dimensional block of quantized residual coefficients, inverse quantization unit 64 inverse quantizes, i.e., de-quantizes, the quantized residual coefficients. Inverse transform unit 66 applies an inverse transform, e.g., an inverse DCT, inverse integer transform, or inverse directional transform, to the de-quantized residual coefficients to produce a residual block of pixel values. Summer 69 sums the prediction block generated by prediction unit 62 with the residual block from inverse transform unit 66 to form a reconstructed video block. In this manner, video decoder 26 reconstructs the frames of video sequence block by block using the header information and the residual information.

Block-based video coding can sometimes result in visually perceivable blockiness at block boundaries of a coded video frame. In such cases, deblock filtering may smooth the block boundaries to reduce or eliminate the visually perceivable blockiness. As such, a deblocking filter (not shown) may also be applied to filter the decoded blocks in order to reduce or remove blockiness. Following any optional deblock filtering, the reconstructed blocks are then placed in frame store 68, which provides reference blocks for spatial and temporal prediction of subsequent video blocks and also produces decoded video to drive display device (such as display device 28 of FIG. 1).

FIG. 4 is a conceptual diagram illustrating a hypothetical example of adaptive scanning consistent with this disclosure.

In this example, coefficient positions are labeled in item 71 as c1-c16. Actual coefficient values are shown in block 1 (72), block 2 (73), block 3 (74) and block 4 (75) for four consecutive blocks. The actual coefficient values of blocks 1-4 may represent quantized residual coefficients, transform coefficients without quantization, or other type of coefficients. In other instances, the positions may represent positions of pixel values of a residual block. Blocks 1-4 may comprise blocks associated with the same prediction mode. In the example illustrated in FIG. 4, blocks 1-4 are 4×4 blocks. However, as described above, the techniques of this disclosure may be extended to apply to blocks of any size. Moreover, although described below with respect to coefficient scanning unit 41 of video encoder 20, coefficient scanning unit 63 of video decoder 26 may collect statistics and adapt the scan order in a similar manner.

Initially, coefficient scanning unit 41 may scan the coefficients of block 1 using a zig-zag scan order. In this case, coefficient scanning unit 41 scans the coefficient positions of block 1 in the following order; c1, c2, c5, c9, c6, c3, c4, c7, c10, c13, c14, c11, c8, c12, c15, c16. Thus, after scanning the coefficients of block 1, coefficient scanning unit 41 outputs a one-dimensional coefficient vector v, where v=[9, 4, 6, 1, 1, 0, 0, 0, 0, 2, 0, 0, 0, 0, 0, 0]. Although in the example illustrated in FIG. 4 coefficient scanning unit 41 initially scans the coefficients of block 1 using the zig-zag scan order, that zig-zag scanning is not the only possible starting point for adaptive scanning. Horizontal scanning, vertical scanning, or any other initial scanning sequence may be used as the initial scan order. The use of zig-zag scan results in a one-dimensional coefficient vector v having a run of four zeros between two non-zero coefficients.

Statistics 1 (76) represents the statistics of block 1. Statistics 1 (76) may be count values for each of the coefficient positions to track the number of times each coefficient position has a non-zero value. In the example of FIG. 4, coefficient statistics are initialized to be all zero. However, other initialization schemes may be used. For example, typical or average coefficient statistics of each of the prediction modes may be used to initialize the statistics of the respective prediction mode. After coding block 1, statistics 1 (76) has values of one for any coefficient position of block 1 that is non-zero and values of zero for any coefficient position of block 1 that has a value of zero. Statistics 2 (77) represents the combined statistics of blocks 1 and 2. Coefficient scanning module 41 increments the counts of statistics 1 (76) when the coefficient positions have non-zero values in block 2 and keeps the counts the same when the coefficient positions have values of zero. Thus, as shown in FIG. 4, coefficient scanning module 41 increments the statistics of coefficient positions c1, c2, c5, c9, and c13 to a value of two and keeps the statistics of the rest of the coefficient positions the same as in statistics 1 (76). Statistics 3 (78) represents the combined statistics of blocks 1-3 and statistics 4 (79) represents the combined statistics of blocks 1-4. As described above, in some aspects, coefficient scanning unit 41 may collect the statistics for the blocks using a plurality of counters.

Coefficient scanning unit 41 may adapt the scan order based on the collected statistics. In the illustrated example, coefficient scanning unit 41 may be configured to adapt the scan order after four video blocks based on statistics 4 (79). In this case, coefficient scanning unit 41 analyzes the collected statistics and adapts the scan order such that the coefficient positions are scanned in descending order by their corresponding count values. As such, coefficient scanning unit 41 may scan blocks 1-4 according to the initial scan order and adapt the scan order to scan positions of subsequent block, e.g., block 5 (not shown), in the following order; c1, c5, c9, c2, c13, c6, c3, c4, c7, c10, c14, c11, c8, c12, c15, c16. Coefficient scanning unit 41 con to scan subsequent blocks in accordance with the new scan order until the scan order is adapted again based on collected statistics for the blocks or re-initialized, e.g., at the beginning of a subsequent coding unit.

Adapting the scan order to change from an initial scan order (e.g., zig-zag scan order) to a new scan order promotes non-zero coefficients at the beginning of the one-dimensional coefficient vector and zero coefficients at the end. In the example of FIG. 4, the new scan order scans the coefficients in the vertical dimension earlier than the coefficients in the horizontal dimension, reflecting the fact that, for the given prediction mode, the coefficients in the vertical dimension have a higher likelihood of being non-zero than the cofficients in the horizontal dimension. Blocks 1-4 may be all have the same prediction mode, and past statistics may be representative of likely future non-zero coefficient locations. Thus, by using past statistics to define the scan order, the techniques of this disclosure may promote grouping of non-zero coefficients near the beginning of a scanned one-dimensional vector and zero value coefficients near the end of the scanned one-dimensional vector, thus eliminating or reducing the number of zero runs between two non-zero coefficients. This, in turn, can improve the level of compression that can be achieved during entropy coding.

Figure 5:
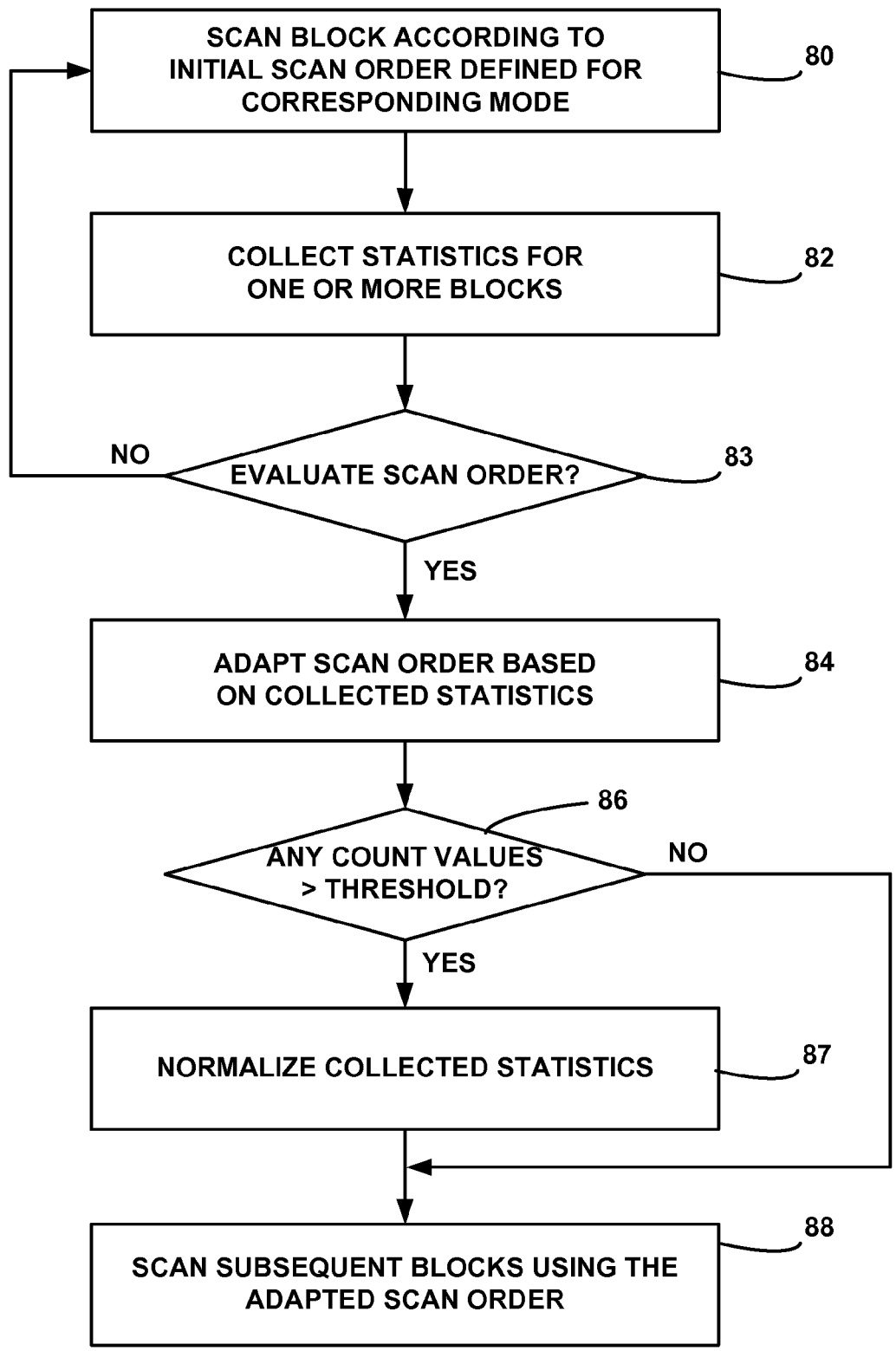
FIG. 5 is a flow diagram illustrating example operation of a coding device configured to adaptively adjust a scan order of coefficients.

FIG. 5 is a flow diagram illustrating a coding technique consistent with this disclosure. The coding technique illustrated in FIG. 5 may be used for either encoding or decoding of video blocks. As shown in FIG. 5, coefficient scanning unit 41, 63 scans coefficients of a block in accordance with an initial scan order defined for the corresponding prediction mode of the current block (80). From the perspective of video encoder 20, scanning converts a two-dimensional block of coefficients to a one-dimensional coefficient vector. From the perspective of video decoder 26, however, the scanning would convert a one-dimensional coefficient vector into a two-dimensional coefficient block. As one example, the initial scan order of the corresponding prediction mode may be a zig-zag scan order. Zig-zag scanning is not the only possible initial scan order. Horizontal scanning, vertical scanning, or any other initial scanning order may be used as the initial scan order.

Coefficient scanning unit 41, 63 collects statistics for one or more blocks (82). In particular, for each of the blocks that are scanned, coefficient scanning unit 41, 63 may collect statistics that track, e.g., with counters, the frequency at which each of the coefficient positions within the two-dimensional block is a non-zero coefficient. Coefficient scanning unit 41, 63 determines whether to evaluate the scan order (83). Coefficient scanning unit 41, 63 may evaluate the scan order at fixed (e.g., at every block boundary or after n block boundaries) or non-fixed intervals (e.g., when one of the count values of a position within the block exceeds a threshold).

If coefficient scanning unit 41, 63 determines not to evaluate the scan order, coefficient scanning unit 41, 63 scans a subsequent block according to the initial scan order (80). If coefficient scanning unit 41, 63 determines to evaluate the scan order, e.g., after n blocks have been encoded/decoded, coefficient scanning unit may adapt the scan order based on the collected statistics (84). For example, coefficient scanning unit 41, 63 may adapt the scan order to scan the coefficient positions of the block in descending order based on their count values, where the count values reflect the likelihood of a given position having a non-zero coefficient. After adapting the scan order, coefficient scanning unit 41, 63 may, in some instances, determine whether any count values of the statistics exceed a threshold value (86). If one of the coefficient positions has a corresponding count value that exceeds the threshold, coefficient scanning unit 41, 63 may normalize the collected statistics, e.g., the coefficient count values (87). For example, coefficient scanning unit 41, 63 may normalize the coefficient count values by reducing each of the count values by a pre-determined factor, e.g, by a factor of two to reduce each of the count values by one-half or resetting the count values to a set of initial count values. Normalizing the coefficient count values may allow video encoder 20 to adapt more quickly to local coefficient statistics.

After normalizing the collected statistics or when no normalization is performed, coefficient scanning unit 41, 63 scans subsequent blocks using the adapted scan order (88). Coefficient scanning unit 41, 63 may scan at least one subsequent block using the adapted scan order when the at least one subsequent block exists within a coding unit of the previously scanned video block. Coefficient scanning unit 41, 63 may continue to scan subsequent video blocks until the scan order is adjusted again or re-initialized, e.g., at a coding unit boundary. In this manner, coefficient scanning unit 41, 63 adapts the scan order based on the collected statistics to scan coefficient positions of the block that are determined to have a higher likelihood of being non-zero before coefficient positions of the block that are determined to have a smaller likelihood of being non-zero. Thus, the one-dimensional coefficient vector is arranged to promote grouping of non-zero coefficients near the beginning of a scanned one-dimensional vector and zero value coefficients near the end of the scanned one-dimensional vector. This, in turn, can improve the level of compression that can be achieved during entropy coding.

In some instances, coefficient scanning unit 41, 63 may adaptively adjust the scan order separately for each of the prediction modes since each of the prediction modes may have different coefficient statistics. In other words, coefficient scanning unit 41, 63 may maintain separate statistics for each of the prediction modes and adjust the scan orders for each of the prediction modes differently based on the respective statistics. Thus, the example flow chart described above may be performed by coefficient scanning unit 41, 63 for each prediction mode.

Figure 6:
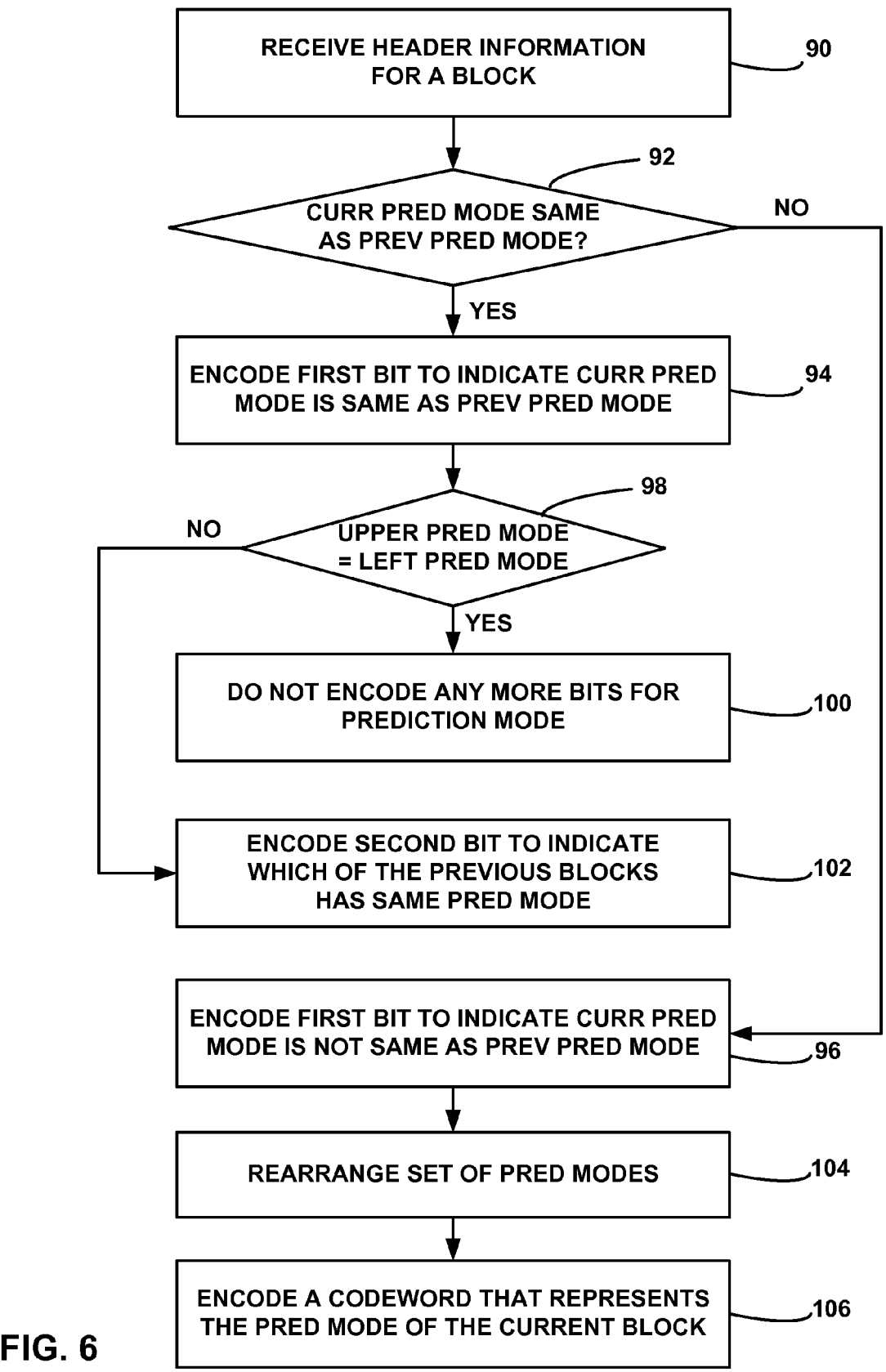
FIG. 6 is a flow diagram illustrating example operation of an encoding unit configured to encode header information for a video block.

FIG. 6 is a flow diagram illustrating example operation of an encoding unit, such as entropy encoding unit 46 of video encoder 20, encoding header information for a video block in accordance with one of the techniques of this disclosure. Entropy encoding unit 46 receives header information for a block in the form of one or more header syntax elements (90). The header syntax elements may identify particular characteristics of the current video block, such as a block type, prediction mode, coded block pattern (CBP) for luma and/or chroma, block partition, and one or more motion vectors. FIG. 6 will be described with respect to encoding the prediction mode of the current block. However, similar techniques may be used to encode other ones of the header syntax elements.

Entropy encoding unit 46 compares a prediction mode of the current block with a prediction mode of one or more previously encoded blocks (92). The one or more previously encoded blocks may, for example, comprise one or more adjacent blocks. In the example of FIG. 6 two previously encoded blocks are analyzed, e.g., an upper neighboring block and a left neighboring block. If the prediction mode of either of the current block is the same as the prediction mode of either of the previously encoded blocks, entropy encoding unit 46 encodes the first bit to indicate so (94). As one example, entropy encoding unit 46 may encode the first bit as a "1" to indicate that the prediction mode of the current block is the same as the prediction mode of either of the previously encoded blocks.

Entropy encoding unit 46 compares the prediction mode of the upper neighboring block to the prediction mode of the left neighboring block (98). If the prediction mode of the upper neighboring block is the same as the prediction mode of the left neighboring block, entropy encoding unit 46 does not encode any more bits for the prediction mode (100). In this case, the prediction mode may be encoded using a single bit.

However, if the prediction mode of the upper neighboring block is not equal to the prediction mode of the left neighboring block, entropy encoding unit 46 encodes a second bit representing the prediction mode to indicate which of the neighboring blocks has the same prediction mode as the current block (102). For example, entropy encoding unit 46 may encode a "1" if the prediction mode of the current block is the same as the prediction mode of the upper neighboring block and encode a "0" if the prediction mode of the current block is the same as the prediction mode of the left neighboring block. As such, entropy encoding unit 46 may encode the prediction mode of the current block using as few as one bit and, at most, two bits when the prediction mode of the current block is equal to the prediction mode of one of the neighboring blocks.

If the prediction mode of the current block is not the same as the prediction mode of either of the previously encoded blocks, entropy encoding unit 46 encodes the first bit to indicate so (96). To continue the example above, entropy encoding unit 46 may encode the first bit as a "0" to indicate that the prediction mode of the current block is not the same as the prediction mode of either of the previously encoded blocks. Entropy encoding unit 46 may rearrange the set of possible prediction modes (104). Entropy encoding unit 46 may rearrange the set of possible prediction modes by removing the prediction mode or modes of the neighboring blocks from the set of possible prediction modes. When the upper and left neighboring blocks have different prediction modes than one another, entropy encoding unit 46 may remove two prediction modes from the set. When the upper and left neighboring blocks have the same prediction mode as one another, entropy encoding unit 46 may remove one prediction mode (i.e., the prediction mode of the upper and left neighboring blocks) from the set. Furthermore, in some instances, entropy encoding unit 46 may selectively remove one or more additional coding modes from the set. When the entropy encoding unit 46 removes one or more additional coding modes, the prediction unit 32 of FIG. 2 also removes the same additional coding modes from the set of possible prediction modes such that these additional coding modes will not be selected. After removing the one or more prediction modes, entropy encoding unit 46 adjusts the mode numbers of the remaining prediction modes of the set.

Entropy encoding unit 46 encodes a codeword that represents the prediction mode of the current block (106). Entropy encoding unit 46 may encode the prediction mode of the current video block using CAVLC, CABAC or other entropy coding methodology. As will be described in more detail with respect to FIG. 7, encoding unit 46 may, in some instances, adaptively select a coding context for use in encoding the prediction mode of the current block based on the prediction modes of the one or more previously encoded blocks.

Figure 7:
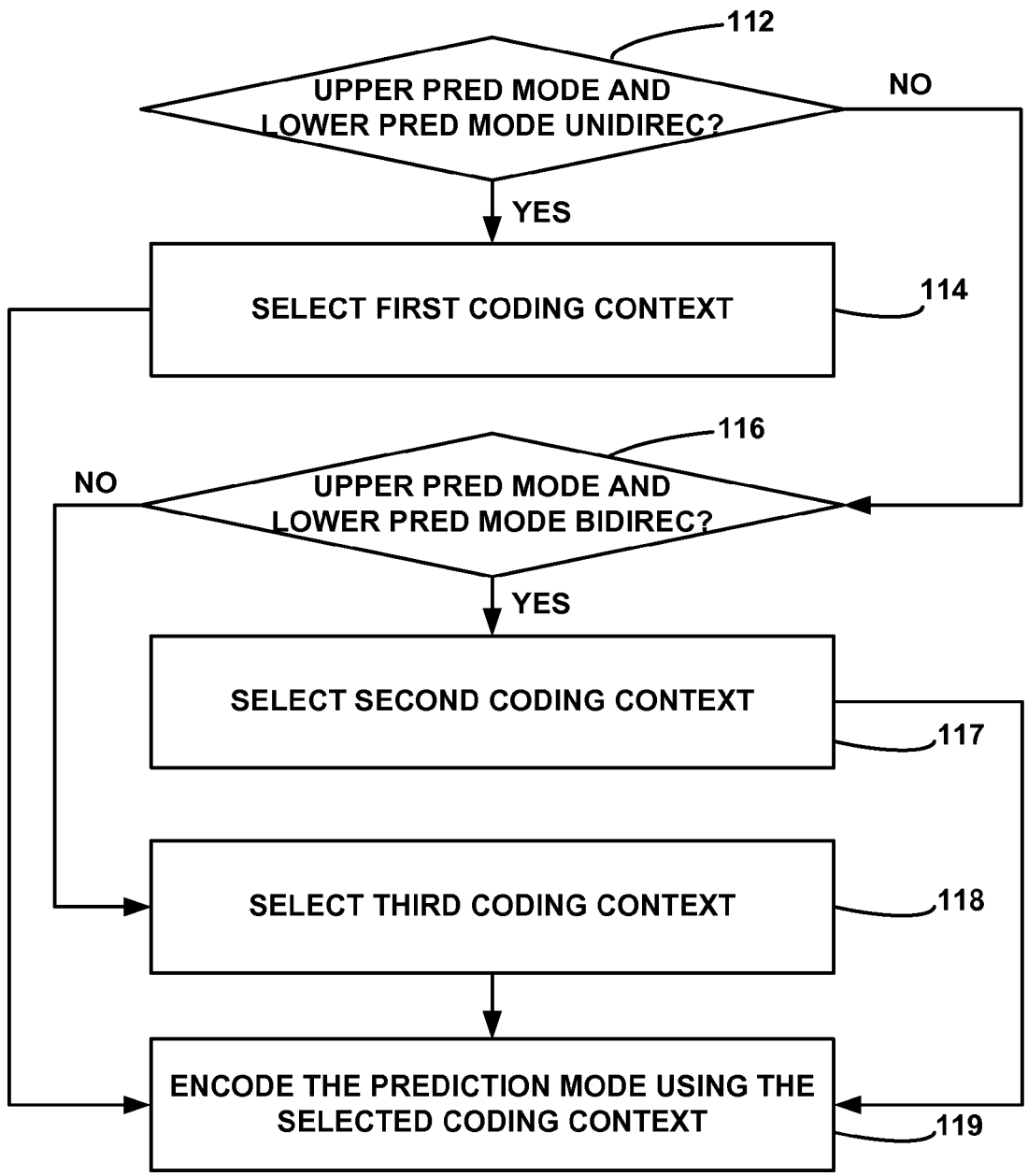
FIG. 7 is a flow diagram illustrating example coding context selection for coding.

FIG. 7 is a flow diagram illustrating coding context selection in accordance with one aspect of this disclosure. As described above, a correlation may exist between the type of prediction mode of the current block and the type of prediction mode of one or more previously encoded blocks, such as an upper and left neighboring block. For example, when the prediction mode of the upper and left neighboring blocks are both unidirectional prediction modes, there is a higher probability that the prediction mode of the current block is also a unidirectional prediction mode. Likewise, when the prediction mode of the upper and left neighboring blocks are both bidirectional prediction modes, there is a higher probability that the prediction mode of the current block is also a bidirectional prediction mode.

As such, entropy encoding unit 46 may determine whether the prediction modes of upper and left neighboring blocks are unidirectional prediction modes (112) and select a first coding context when the prediction modes of both the upper and left neighboring blocks are unidirectional prediction modes (114). The first coding context models the probability distribution for the prediction mode of the current video block when the prediction mode of both of the upper and the left neighboring blocks are unidirectional. The probability distribution of the first coding context may provide higher probabilities for the unidirectional prediction modes of the set than the bidirectional prediction modes of the set. In the case of CAVLC, for example, the first coding context may use a coding table that associates shorter codewords with the unidirectional prediction modes than the codewords associated with the bidirectional prediction modes.

When the prediction modes of each of the upper and left neighboring blocks are not unidirectional prediction modes, entropy encoding unit 46 may determine whether the prediction modes of each of the upper and left neighboring blocks are bidirectional prediction modes (116). Entropy encoding unit 46 may select a second coding context when the prediction mode of each of the upper and left neighboring blocks are both bidirectional prediction modes (117). The second coding context models the probability distribution for the prediction mode of the current video block based on the assumption that there exists a higher probability that the current mode is a bidirectional prediction mode than a unidirectional prediction mode. Again, in the case of CAVLC, for example, the second coding context may using a coding table that associates shorter codewords with the bidirectional prediction modes than the codewords associated with the unidirectional prediction modes.

When the prediction modes of the upper and left neighboring blocks are not both bidirectional prediction modes, i.e., the prediction modes of the previously encoded blocks are a combination of bidirectional and unidirectional prediction modes, entropy encoding unit 46 may select a third coding context (118). The third coding context is generated under the assumption that the probability of the current prediction mode is more evenly distributed among the unidirectional prediction modes and the bidirectional prediction modes of the set. In the case of CAVLC, for example, the third coding context may use a coding table that associates codewords of similar code lengths with the bidirectional prediction modes and the unidirectional prediction modes.

Entropy encoding module 46 encodes the prediction mode of the current video block in accordance with the selected coding context (119). Selecting different coding contexts for use in encoding the prediction mode of the current video block based on the prediction modes of one or more previously encoded video blocks may result in better compression of the prediction mode information. The same coding context selection technique is performed by decoding unit 60 such that the decoding unit 60 may accurately decode the prediction modes of the video blocks.

Figure 8:
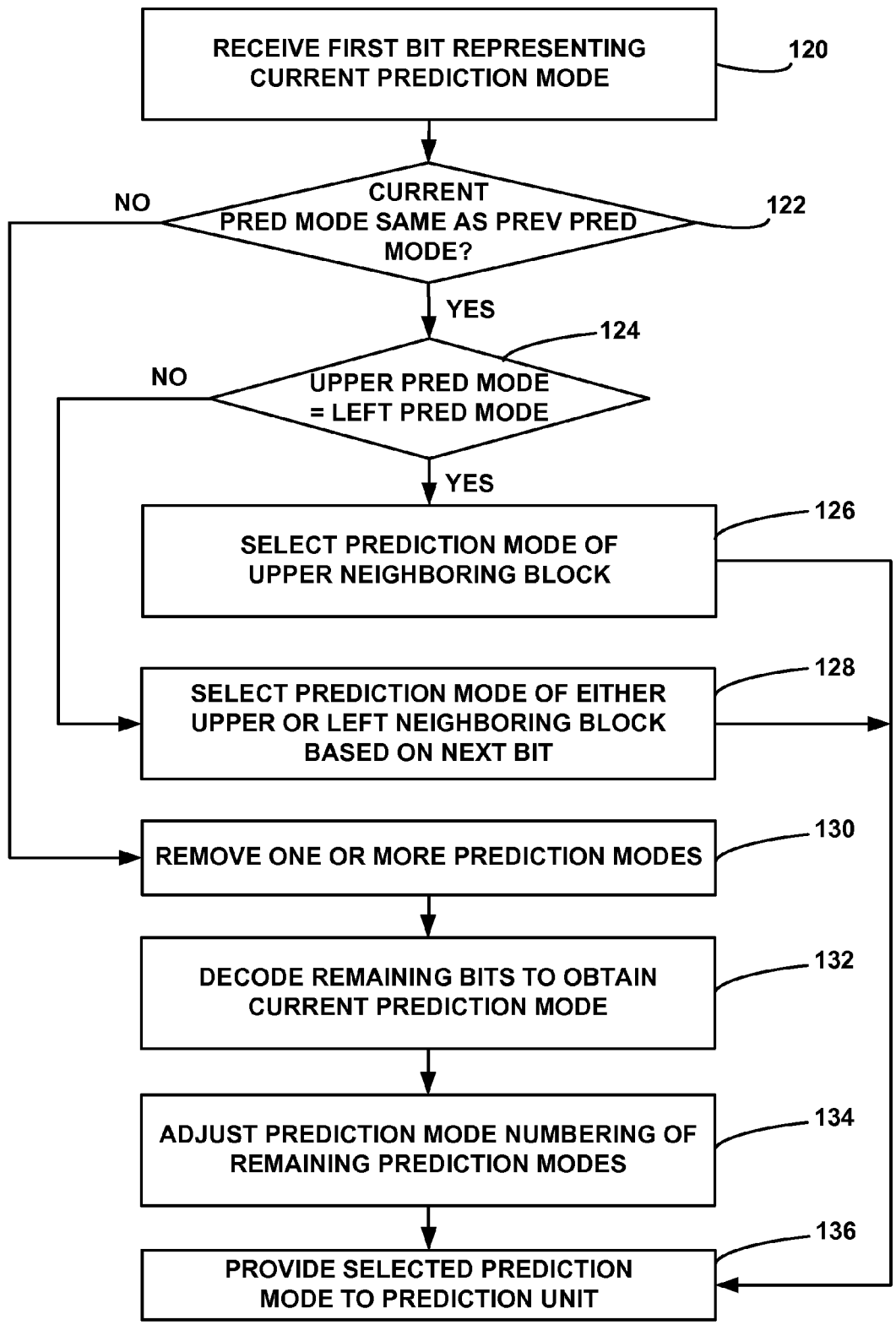
FIG. 8 is a flow diagram illustrating example operation of a decoding unit configured to decode header information of a video block.

FIG. 8 is a flow diagram illustrating example operation of a decoding unit, such as entropy decoding unit 60 of video decoder 26 decodes header information of a video block in accordance with the techniques of this disclosure. Entropy decoding unit 60 decodes an encoded video bitstream to obtain header information, e.g., in the form of one or more header syntax elements. Description of entropy decoding unit 60 performing decoding of a prediction mode is described for purposes of example. The techniques may be extended to decoding of other header syntax elements, such as a block type, block partition, CBP, or the like.

In particular, entropy decoding unit 60 receives a first bit representing the prediction mode of the current block (120). Entropy decoding unit 60 determines whether the first bit representing the prediction mode indicates that the prediction mode of the current block is the same as the prediction mode of a previously decoded block, e.g., either an upper or left neighboring block (122). Entropy decoding module 60 may, for example, determine that the prediction mode of the current block is the same as the prediction mode of one of the upper and left neighboring blocks when the first bit is "1" and that the prediction mode of the current block is not the same as the prediction modes of the upper and left neighboring blocks when the first bit is "0."

When entropy decoding unit 60 determines that the prediction mode of the current block is the same as the prediction mode of one of the upper and left neighboring blocks, entropy decoding unit 60 determines whether the prediction mode of the upper neighboring block and the prediction mode of the left neighboring block are the same (124). When the prediction mode of the upper neighboring block and the prediction mode of the left neighboring block are the same, no more bits representing the prediction mode of the current video block are received, and entropy decoding unit 60 selects the prediction mode of either of the neighboring blocks as the prediction mode of the current block (126). When the prediction mode of the upper neighboring block and the prediction mode of the left neighboring block are different, one additional bit representing the prediction mode is received, and entropy decoding unit 60 selects the prediction mode of the correct neighboring block as the prediction mode of the current block based on the next received bit representing the prediction mode (128). For example, entropy decoding unit 60 may select the prediction mode of the upper neighboring block as the prediction mode of the current block when the next received bit is "1" and select the prediction mode of the left neighboring block as the prediction mode of the current block when the next received bit is "0."

When entropy decoding unit 60 determines that the prediction mode of the current block is not the same as the prediction mode of either of the upper and left neighboring blocks, i.e., when the first bit representing the prediction mode is "0," entropy decoding unit 60 entropy decoding unit 60 may remove one or more prediction modes of the set of possible prediction modes (130). Entropy decoding unit 60 may remove the prediction modes of the upper and left neighboring blocks from the set of possible prediction modes. If the upper and left neighboring blocks have the same prediction mode, entropy decoding unit 60 may remove the prediction mode of the neighboring blocks and at least one other prediction mode as described in detail above.

Entropy decoding unit 60 decodes the remaining bits, e.g., four bits in the example described, to obtain the prediction mode number of the prediction mode of the current block (132). Entropy decoding unit 60 may adjust the prediction mode numbering of the remaining prediction modes (134) in a manner reciprocal of the prediction mode numbering adjustment process performed by entropy encoding unit 46. In one example, entropy decoding unit 60 may renumber the decoded prediction mode numbers (ranging from 0 to 15) to the original prediction mode numbers (ranging from 0 to 17) by inserting back the prediction modes that have been removed. In some instances, entropy decoding unit 60 may select different coding contexts for a prediction mode of the block based on the prediction modes of one or more previously decoded video blocks, e.g., based on whether the prediction modes of the previously decoded blocks are both unidirectional, both bidirectional, or one unidirectional the other one bidirectional, as described in detail above. Entropy decoding unit 60 provides the prediction mode to a prediction unit 62 to generate a prediction block according the selected prediction mode (136). As described with respect to FIG. 3, the prediction block is combined with the residual pixel values to generate a reconstructed block for presentation to a user.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of this disclosure have been described. These and other embodiments are within the scope of the following claims.

The invention claimed is:

1. A method of encoding video data, the method comprising:
    selecting one of a plurality of intra prediction modes for use in generating a prediction block of a video block of a coding unit; and
    encoding the prediction mode of the current video block based on prediction modes of one or more previously encoded video blocks of the coding unit, wherein encoding the prediction mode of the current video block based on prediction modes of one or more previously encoded video blocks of the coding unit comprises:
        encoding a first bit representing the prediction mode to indicate that the prediction mode of the current block is not the same as any of the prediction modes of the one or more previously encoded video blocks;
        removing at least the prediction modes of the one or more previously encoded video blocks from the plurality of prediction modes;
        removing at least one additional prediction mode that is not a prediction mode of the one or more previously encoded video blocks when two or more of the previously encoded video blocks of the coding unit have the same prediction mode;
        temporarily rearranging prediction mode identifiers among the remaining prediction modes of the plurality of prediction modes; and
        encoding a codeword that identifies the prediction mode identifier corresponding to the prediction mode of the current video block.

2. The method of claim 1, further comprising selecting one of a plurality of coding contexts for use in encoding the prediction mode of the video block based on the prediction modes of the one or more previously encoded video blocks of the coding unit, wherein encoding comprises encoding according to the selected coding context.

3. The method of claim 2, wherein selecting one of the coding contexts comprises:
    selecting a first coding context when the prediction modes of the one or more previously encoded video blocks are all unidirectional prediction modes;
    selecting a second coding context when the prediction modes of the one or more previously encoded video blocks are all multi-directional prediction modes; and
    selecting a third coding context when the prediction modes of the one or more previously encoded video blocks are neither all unidirectional nor all multi-directional.

4. The method of claim 1, further comprising:
    subtracting the prediction block generated using the selected prediction mode from the video block to form a residual block;
    selecting a transform to apply to the residual block based on the selected prediction mode; and
    applying the selected transform to the residual block to generate residual transform coefficients.

5. The method of claim 4, further comprising storing a plurality of directional transforms that each corresponds with one of the prediction modes, wherein each of the plurality of directional transforms comprises a transform matrix of size $N^2 \times N^2$, where N is a dimension of the video block.

6. The method of claim 1, wherein the plurality of prediction modes includes unidirectional prediction modes and a subset of possible bidirectional prediction modes, the subset of bidirectional prediction modes including at least one combination that includes each of the unidirectional prediction modes.

7. The method of claim 1, wherein encoding the prediction mode of the current video block based on prediction modes of one or more previously encoded video blocks of the coding unit comprises:
    encoding the first bit representing the prediction mode to indicate that the prediction mode of the current block is the same as one of the prediction modes of the one or more previously encoded video blocks; and encoding, when the prediction modes of the one or more previously encoded video blocks are not the same as one another, at least one additional bit representing the prediction mode to indicate which of the one or more previously encoded video blocks has the same prediction mode as the prediction mode of the video block.

8. A device that encodes video data, the device comprising:
a prediction unit that selects one of a plurality of intra prediction modes for use in generating a prediction block of a video block of a coding unit; and
an entropy encoding unit that encodes the prediction mode of the current video block based on prediction modes of one or more previously encoded video blocks of the coding unit;
wherein the prediction unit:
removes at least the prediction modes of the one or more previously encoded video blocks from the plurality of prediction modes,
removes at least one additional prediction mode that is not a prediction mode of the one or more previously encoded video blocks when two or more of the previously encoded video blocks of the coding unit have the same prediction mode, and
temporarily rearranges prediction mode identifiers among the remaining prediction modes of the plurality of prediction modes, and the entropy encoding unit:
encodes a first bit representing the prediction mode to indicate that the prediction mode of the current block is not the same as any of the prediction modes of the one or more previously encoded video blocks, and
encodes a codeword that identifies the prediction mode identifier corresponding to the prediction mode of the current video block.

9. The device of claim 8, wherein the entropy encoding unit selects one of a plurality of coding contexts for use in encoding the prediction mode of the video block based on the prediction modes of the one or more previously encoded video blocks of the coding unit and encodes the prediction mode according to the selected coding context.

10. The device of claim 9, wherein the entropy encoding unit selects a first coding context when the prediction modes of the one or more previously encoded video blocks are all unidirectional prediction modes, selects a second coding context when the prediction modes of the one or more previously encoded video blocks are all multi-directional prediction modes and selects a third coding context when the prediction modes of the one or more previously encoded video blocks are neither all unidirectional nor all multi-directional.

11. The device of claim 8, further comprising a transform unit that selects a transform to apply to a residual block based on the selected prediction mode and applies the selected transform to the residual block to generate residual transform coefficients, wherein the entropy encoding unit encodes the residual transform coefficients.

12. The device of claim 11, further comprising a memory that stores a plurality of directional transforms that each correspond with one of the prediction modes, wherein each of the directional transforms comprises a column transform matrix of size N×N and a row transform matrix of size N×N, where N×N is a dimension of the video block.

13. The device of claim 11, further comprising a memory that stores a plurality of directional transforms that each corresponds with one of the prediction modes, wherein each of the plurality of directional transforms comprises a transform matrix of size $N^2 \times N^2$, where N is a dimension of the video block.

14. The device of claim 8, wherein the plurality of prediction modes includes unidirectional prediction modes and a subset of possible bidirectional prediction modes, the subset of bidirectional prediction modes including at least one combination that includes each of the unidirectional prediction modes.

15. The device of claim 8, wherein the entropy encoding unit:
encodes the first bit representing the prediction mode to indicate that the prediction mode of the current block is the same as one of the prediction modes of the one or more previously encoded video blocks; and
encodes at least one additional bit when the prediction modes of the one or more previously encoded video blocks are not the same as one another, the at least one additional bit indicating which of the one or more previously encoded video blocks has the same prediction mode as the prediction mode of the video block.

16. The device of claim 8, wherein the device comprises a wireless communication device.

17. The device of claim 8, wherein the device comprises an integrated circuit device.

18. A non-transitory, computer-readable medium comprising instructions that upon execution in a video coding device cause the device to code video blocks, wherein the instructions cause the device to:
select one of a plurality of intra prediction modes for use in generating a prediction block of a video block of a coding unit; and
encode the prediction mode of the current video block based on prediction modes of one or more previously encoded video blocks of the coding unit;
encode a first bit representing the prediction mode to indicate that the prediction mode of the current block is not the same as any of the prediction modes of the one or more previously encoded video blocks;
remove at least the prediction modes of the one or more previously encoded video blocks from the plurality of prediction modes;
remove at least one additional prediction mode that is not a prediction mode of the one or more previously encoded video blocks when two or more of the previously encoded video blocks of the coding unit have the same prediction mode;
temporarily rearrange prediction mode identifiers among the remaining prediction modes of the plurality of prediction modes; and
encode a codeword that identifies the prediction mode identifier corresponding to the prediction mode of the current video block.

19. The computer-readable medium of claim 18, further comprising instructions that cause the device to select one of a plurality of coding contexts for use in encoding the prediction mode of the video block based on the prediction modes of the one or more previously encoded video blocks of the coding unit, wherein encoding comprises encoding according to the selected coding context.

20. The computer-readable medium of claim 19, wherein the instructions cause the device to:
select a first coding context when the prediction modes of the one or more previously encoded video blocks are all unidirectional prediction modes;
select a second coding context when the prediction modes of the one or more previously encoded video blocks are all multi-directional prediction modes; and select a third coding context when the prediction modes of the one or more previously encoded video blocks are neither all unidirectional nor all multi-directional.

21. The computer-readable medium of claim 18, further comprising instructions to cause the device to:
  subtracting the prediction block generated using the selected prediction mode from the video block to form a residual block;
  select a transform to apply to the residual block based on the selected prediction mode; and
  apply the selected transform to the residual block to generate residual transform coefficients.

22. The computer-readable medium of claim 21, further comprising instructions that cause the device to store a plurality of directional transforms that each correspond with one of the prediction modes, wherein each of the directional transforms comprises a column transform matrix of size N×N and a row transform matrix of size N×N, where N×N is a dimension of the video block.

23. The computer-readable medium of claim 21, further comprising instructions that cause the device to storing a plurality of directional transforms that each corresponds with one of the prediction modes, wherein each of the plurality of directional transforms comprises a transform matrix of size $N^2 \times N^2$, where N is a dimension of the video block.

24. The computer-readable medium of claim 18, wherein the plurality of prediction modes includes unidirectional prediction modes and a subset of possible bidirectional prediction modes, the subset of bidirectional prediction modes including at least one combination that includes each of the unidirectional prediction modes.

25. The computer-readable medium of claim 18, wherein the instructions cause the device to:
  encode the first bit representing the prediction mode to indicate that the prediction mode of the current block is the same as one of the prediction modes of the one or more previously encoded video blocks; and
  encode, when the prediction modes of the one or more previously encoded video blocks are not the same as one another, at least one additional bit representing the prediction mode to indicate which of the one or more previously encoded video blocks has the same prediction mode as the prediction mode of the video block.

26. A device that encodes video data, the device comprising:
  means for selecting one of a plurality of intra prediction modes for use in generating a prediction block of a video block of a coding unit; and
  means for encoding the prediction mode of the current video block based on prediction modes of one or more previously encoded video blocks of the coding unit;
  wherein the means for selecting one of the plurality of prediction modes:
    removes at least the prediction modes of the one or more previously encoded video blocks from the plurality of prediction modes,
    removes at least one additional prediction mode that is not a prediction mode of the one or more previously encoded video blocks when two or more of the previously encoded video blocks of the coding unit have the same prediction mode, and
    temporarily rearranges prediction mode identifiers among the remaining prediction modes of the plurality of prediction modes, and
  the encoding means:
    encodes a first bit representing the prediction mode to indicate that the prediction mode of the current block is not the same as any of the prediction modes of the one or more previously encoded video blocks, and
    encodes a codeword that identifies the prediction mode identifier corresponding to the prediction mode of the current video block.

27. The device of claim 26, further comprising means for selecting one of a plurality of coding contexts for use in encoding the prediction mode of the video block based on the prediction modes of the one or more previously encoded video blocks of the coding unit, wherein encoding comprises encoding according to the selected coding context.

28. The device of claim 27, wherein the selecting means selects a first coding context when the prediction modes of the one or more previously encoded video blocks are all unidirectional prediction modes, selects a second coding context when the prediction modes of the one or more previously encoded video blocks are all multi-directional prediction modes, and selects a third coding context when the prediction modes of the one or more previously encoded video blocks are neither all unidirectional nor all multi-directional.

29. The device of claim 26, further comprising:
  means for subtracting the prediction block generated using the selected prediction mode from the video block to form a residual block;
  means for selecting a transform to apply to residual block based on the selected prediction mode; and
  means for applying the selected transform to the residual block to generate residual transform coefficients.

30. The device of claim 29, further comprising means for storing a plurality of directional transforms that each correspond with one of the prediction modes, wherein each of the directional transforms comprises a column transform matrix of size N×N and a row transform matrix of size N×N, where N×N is a dimension of the video block.

31. The device of claim 29, further comprising storing a plurality of directional transforms that each corresponds with one of the prediction modes, wherein each of the plurality of directional transforms comprises a transform matrix of size $N^2 \times N^2$, where N is a dimension of the video block.

32. The device of claim 26, wherein the plurality of prediction modes includes unidirectional prediction modes and a subset of possible bidirectional prediction modes, the subset of bidirectional prediction modes including at least one combination that includes each of the unidirectional prediction modes.

33. The device of claim 26, wherein the encoding means encodes the first bit representing the prediction mode to indicate that the prediction mode of the current block is the same as one of the prediction modes of the one or more previously encoded video blocks and encodes, when the prediction modes of the one or more previously encoded video blocks are not the same as one another, at least one additional bit representing the prediction mode to indicate which of the one or more previously encoded video blocks has the same prediction mode as the prediction mode of the video block.

34. A method of decoding video data, the method comprising:
  receiving encoded video data of a video block of a coding unit; and
  decoding the encoded video data to identify one of a plurality of intra prediction modes for use in generating a prediction block of the video block based on prediction modes of one or more previously decoded video blocks of the coding unit;
  wherein decoding the encoded video data to identify one of the plurality of prediction modes for use in generating a prediction block of the video block based on prediction modes of one or more previously decoded video blocks of the coding unit comprises:

identifying the prediction mode for use in generating the prediction block of the video block as not being any of the prediction modes of the one or more previously decoded video blocks based on a first encoded bit representing the prediction mode;

removing at least the prediction modes of the one or more previously decoded video blocks from the plurality of prediction modes;

removing at least one additional prediction mode that is not the prediction mode of the one or more previously encoded video blocks when two or more of the previously encoded video blocks of the coding unit have the same prediction mode;

temporarily rearranging prediction mode identifiers among the remaining prediction modes of the plurality of prediction modes; and decoding a codeword to identify the prediction mode identifier corresponding to the prediction mode for use in generating a prediction block of the current video block.

35. The method of claim 34, further comprising selecting one of a plurality of coding contexts for use in decoding the prediction mode of the video block based on the prediction modes of the one or more previously decoded video blocks of the coding unit, wherein decoding comprises decoding according to the selected coding context.

36. The method of claim 35, wherein selecting one of the plurality of coding contexts comprises:

selecting a first coding context when the prediction modes of the one or more previously decoded video blocks are all unidirectional prediction modes;

selecting a second coding context when the prediction modes of the one or more previously decoded video blocks are all multi-directional prediction modes; and selecting a third coding context when the prediction modes of the one or more previously decoded video blocks are neither all unidirectional or all multi-directional.

37. The method of claim 34, further comprising:

selecting an inverse transform to apply to residual transform coefficients of the video block based on the identified prediction mode; and applying the selected inverse transform to the residual transform coefficients of the video block to generate residual data.

38. The method of claim 37, further comprising storing a plurality of inverse directional transforms that each corresponds with one of the prediction modes, wherein each of the plurality of inverse directional transforms comprises a column transform matrix of size N×N and a row transform matrix of size N×N, where N×N is a dimension of the video block.

39. The method of claim 37, further comprising storing a plurality of inverse directional transforms that each corresponds with one of the prediction modes, wherein each of the plurality of inverse directional transforms comprises a transform matrix of size $N^2 \times N^2$, where N×N is a dimension of the video block.

40. The method of claim 34, wherein the plurality of prediction modes includes unidirectional prediction modes and a subset of possible bidirectional prediction modes, the subset of bidirectional prediction modes including at least one combination that includes each of the unidirectional prediction modes.

41. The method of claim 34, wherein decoding the encoded video data to identify one of the plurality of prediction modes for use in generating a prediction block of the video block based on prediction modes of one or more previously decoded video blocks of the coding unit comprises:

identifying the prediction mode for use in generating the prediction block of the video block as one of the prediction modes of the one or more previously decoded video blocks based on the first encoded bit representing the prediction mode; and selecting the prediction mode of any of the one or more previously decoded video blocks when the prediction modes of the one or more previously decoded video blocks are the same.

42. The method of claim 41, further comprising:

identifying, when the prediction mode of the one or more previously decoded video blocks are not the same, which of the one or more previously decoded video blocks has the same prediction mode as the prediction mode for use in generating the prediction block of the video block based on at least one additional encoded bit representing the prediction mode; and selecting the prediction mode of the identified previously decoded video block.

43. A device for decoding video data, the device comprising:

an entropy decoding unit that decodes encoded video data of a video block of a coding unit to identify one of a plurality of intra prediction modes for use in generating a prediction block of the video block based on prediction modes of one or more previously decoded video blocks of the coding unit; and a prediction unit that generates the prediction block using the decoded prediction mode:, wherein the decoding unit:

identifies the prediction mode for use in generating the prediction block of the video block as not being any of the prediction modes of the one or more previously decoded video blocks based on a first encoded bit representing the prediction mode;

removes at least the prediction modes of the one or more previously decoded video blocks from the plurality of prediction modes;

removes at least one additional prediction mode that is not the prediction mode of the one or more previously encoded video blocks when two or more of the previously encoded video blocks of the coding unit have the same prediction mode;

temporarily rearranges prediction mode identifiers among the remaining prediction modes of the plurality of prediction modes; and decodes a codeword to identify the prediction mode identifier corresponding to the prediction mode for use in generating a prediction block of the current video block.

44. The device of claim 43, wherein the entropy decoding unit selects one of a plurality of coding contexts for use in decoding the prediction mode of the video block based on the prediction modes of the one or more previously decoded video blocks of the coding unit, wherein decoding comprises decoding according to the selected coding context.

45. The device of claim 44, wherein the entropy decoding unit:

selects a first coding context when the prediction modes of the one or more previously decoded video blocks are all unidirectional prediction modes;

selects a second coding context when the prediction modes of the one or more previously decoded video blocks are all multi-directional prediction modes; and selects a third coding context when the prediction modes of the one or more previously decoded video blocks are neither all unidirectional or all multi-directional.

46. The device of claim 43, further comprising an inverse transform unit that:
    selects an inverse transform to apply to residual transform coefficients of the video block based on the identified prediction mode; and
    applies the selected inverse transform to the residual transform coefficients of the video block to generate a residual data.

47. The device of claim 43, wherein the plurality of prediction modes includes unidirectional prediction modes and a subset of possible bidirectional prediction modes, the subset of bidirectional prediction modes including at least one combination that includes each of the unidirectional prediction modes.

48. The device of claim 43, wherein the decoding unit:
    identifies the prediction mode for use in generating the prediction block of the video block as one of the prediction modes of the one or more previously decoded video blocks based on the first encoded bit representing the prediction mode; and
    selects the prediction mode of any of the one or more previously decoded video blocks
    when the prediction modes of the one or more previously decoded video blocks are the same.

49. The device of claim 48, wherein the decoding unit:
    identifies, when the prediction mode of the one or more previously decoded video blocks are not the same, which of the one or more previously decoded video blocks has the same prediction mode as the prediction mode for use in generating the prediction block of the video block based on at least one additional encoded bit representing the prediction mode; and
    selects the prediction mode of the identified previously decoded video block.

50. The device of claim 43, wherein the device comprises a wireless communication device.

51. The device of claim 43, wherein the device comprises an integrated circuit device.

52. A non-transitory, computer-readable medium comprising instructions that upon execution in a video coding device cause the device to code video blocks, wherein the instructions cause the device to:
    receive encoded video data of a video block of a coding unit; and
    decode the encoded video data to identify one of a plurality of intra prediction modes for use in generating a prediction block of the video block based on prediction modes of one or more previously decoded video blocks of the coding unit;
    identify the prediction mode for use in generating the prediction block of the video block as not being any of the prediction modes of the one or more previously decoded video blocks based on a first encoded bit representing the prediction mode;
    remove at least the prediction modes of the one or more previously decoded video blocks from the plurality of prediction modes;
    remove at least one additional prediction mode that is not the prediction mode of the one or more previously encoded video blocks when two or more of the previously encoded video blocks of the coding unit have the same prediction mode;
    temporarily rearrange prediction mode identifiers among the remaining prediction modes of the plurality of prediction modes; and
    decode a codeword to identify the prediction mode identifier corresponding to the prediction mode for use in generating a prediction block of the current video block.

53. The computer-readable medium of claim 52, further comprising instructions that cause the device to select one of a plurality of coding contexts for use in decoding the prediction mode of the video block based on the prediction modes of the one or more previously decoded video blocks of the coding unit, wherein decoding comprises decoding according to the selected coding context.

54. The computer-readable medium of claim 53, wherein the instructions cause the device to:
    select a first coding context when the prediction modes of the one or more previously decoded video blocks are all unidirectional prediction modes;
    select a second coding context when the prediction modes of the one or more previously decoded video blocks are all multi-directional prediction modes; and
    select a third coding context when the prediction modes of the one or more previously decoded video blocks are neither all unidirectional or all multi-directional.

55. The computer-readable medium of claim 52, further comprising instructions that cause the device to:
    select an inverse transform to apply to residual transform coefficients of the video block based on the identified prediction mode; and
    apply the selected inverse transform to the residual transform coefficients of the video block to generate residual data.

56. The computer-readable medium of claim 55, further comprising instructions that cause the device to store a plurality of inverse directional transforms that each corresponds with one of the prediction modes, wherein each of the plurality of inverse directional transforms comprises a column transform matrix of size N×N and a row transform matrix of size N×N, where N×N is a dimension of the video block.

57. The computer-readable medium of claim 55, further comprising instructions that cause the device to store a plurality of inverse directional transforms that each corresponds with one of the prediction modes, wherein each of the plurality of inverse directional transforms comprises a transform matrix of size $N^2 \times N^2$, where N×N is a dimension of the video block.

58. The computer-readable medium of claim 52, wherein the plurality of prediction modes includes unidirectional prediction modes and a subset of possible bidirectional prediction modes, the subset of bidirectional prediction modes including at least one combination that includes each of the unidirectional prediction modes.

59. The computer-readable medium of claim 52, wherein the instructions cause the device to:
    identify the prediction mode for use in generating the prediction block of the video block as one of the prediction modes of the one or more previously decoded video blocks based on the first encoded bit representing the prediction mode; and
    select the prediction mode of any of the one or more previously decoded video blocks
    when the prediction modes of the one or more previously decoded video blocks are the same.

60. The computer-readable medium of claim 59, further comprising instructions that cause the device to:
    identify, when the prediction mode of the one or more previously decoded video blocks are not the same, which of the one or more previously decoded video blocks has the same prediction mode as the prediction mode for use in generating the prediction block of the video block based on at least one additional encoded bit representing the prediction mode; and select the prediction mode of the identified previously decoded video block.

61. A device for decoding video data, the device comprising:

means for receiving encoded video data of a video block of a coding unit; and means for decoding the encoded video data to identify one of a plurality of intra prediction modes for use in generating a prediction block of the video block based on prediction modes of one or more previously decoded video blocks of the coding unit;

wherein the means for decoding the encoding video data:
identifies the prediction mode for use in generating the prediction block of the video block as not being any of the prediction modes of the one or more previously decoded video blocks based on a first encoded bit representing the prediction mode;

removes at least the prediction modes of the one or more previously decoded video blocks from the plurality of prediction modes;

removes at least one additional prediction mode that is not the prediction mode of the one or more previously encoded video blocks when two or more of the previously encoded video blocks of the coding unit have the same prediction mode;

temporarily rearranges prediction mode identifiers among the remaining prediction modes of the plurality of prediction modes; and decodes a codeword to identify the prediction mode identifier corresponding to the prediction mode for use in generating a prediction block of the current video block.

62. The device of claim 61, wherein the decoding means selects one of a plurality of coding contexts for use in decoding the prediction mode of the video block based on the prediction modes of the one or more previously decoded video blocks of the coding unit, wherein decoding comprises decoding according to the selected coding context.

63. The device of claim 62, wherein the decoding means:
selects a first coding context when the prediction modes of the one or more previously decoded video blocks are all unidirectional prediction modes;

selects a second coding context when the prediction modes of the one or more previously decoded video blocks are all multi-directional prediction modes; and selects a third coding context when the prediction modes of the one or more previously decoded video blocks are neither all unidirectional or all multi-directional.

64. The device of claim 61, further comprising means for transforming residual transform coefficients, wherein the transforming means:
selects an inverse transform to apply to residual transform coefficients of the video block based on the identified prediction mode; and applies the selected inverse transform to the residual transform coefficients of the video block to generate residual data.

65. The device of claim 64, further comprising means for storing a plurality of inverse directional transforms that each corresponds with one of the prediction modes, wherein each of the plurality of inverse directional transforms comprises a column transform matrix of size N×N and a row transform matrix of size N×N, where N×N is a dimension of the video block.

66. The device of claim 64, further comprising means for storing a plurality of inverse directional transforms that each corresponds with one of the prediction modes, wherein each of the plurality of inverse directional transforms comprises a transform matrix of size $N^2 \times N^2$, where N×N is a dimension of the video block.

67. The device of claim 61, wherein the plurality of prediction modes includes unidirectional prediction modes and a subset of possible bidirectional prediction modes, the subset of bidirectional prediction modes including at least one combination that includes each of the unidirectional prediction modes.

68. The device of claim 61, wherein the decoding means:
identifies the prediction mode for use in generating the prediction block of the video block as one of the prediction modes of the one or more previously decoded video blocks based on the first encoded bit representing the prediction mode; and selects the prediction mode of any of the one or more previously decoded video blocks
when the prediction modes of the one or more previously decoded video blocks are the same.

69. The device of claim 68, wherein the decoding means:
identifies, when the prediction mode of the one or more previously decoded video blocks are not the same, which of the one or more previously decoded video blocks has the same prediction mode as the prediction mode for use in generating the prediction block of the video block based on at least one additional encoded bit representing the prediction mode; and selects the prediction mode of the identified previously decoded video block.

* * * * *